United States Patent
Spirer

(10) Patent No.: US 9,535,577 B2
(45) Date of Patent: Jan. 3, 2017

(54) APPARATUS, METHOD, AND COMPUTER PROGRAM PRODUCT FOR SYNCHRONIZING INTERACTIVE CONTENT WITH MULTIMEDIA

(71) Applicant: Questionmine, LLC, Austin, TX (US)

(72) Inventor: Gary Spirer, Austin, TX (US)

( * ) Notice: Subject to any disclaimer, the term of this patent is extended or adjusted under 35 U.S.C. 154(b) by 293 days.

(21) Appl. No.: 13/943,708

(22) Filed: Jul. 16, 2013

(65) Prior Publication Data

US 2014/0026048 A1     Jan. 23, 2014

Related U.S. Application Data

(60) Provisional application No. 61/672,110, filed on Jul. 16, 2012, provisional application No. 61/791,191, filed on Mar. 15, 2013.

(51) Int. Cl.
| | |
|---|---|
| *G06F 3/0484* | (2013.01) |
| *H04N 21/43* | (2011.01) |
| *H04N 21/431* | (2011.01) |
| *H04N 21/475* | (2011.01) |

(52) U.S. Cl.
CPC .......... *G06F 3/0484* (2013.01); *H04N 21/431* (2013.01); *H04N 21/4302* (2013.01); *H04N 21/475* (2013.01)

(58) Field of Classification Search
CPC ..... G06F 3/0484; G06F 3/048; H04N 21/4302
USPC ........................................................ 715/716
See application file for complete search history.

(56) References Cited

U.S. PATENT DOCUMENTS

| | | |
|---|---|---|
| 5,585,858 A | 12/1996 | Harper et al. |
| 5,861,881 A | 1/1999 | Freeman et al. |
| 6,426,778 B1 | 7/2002 | Valdez, Jr. |
| 7,158,676 B1 | 1/2007 | Rainsford |
| 7,631,330 B1 | 12/2009 | Des Jardins |
| 7,703,040 B2 | 4/2010 | Cutrell et al. |
| 7,711,774 B1 * | 5/2010 | Rothschild ............... 709/205 |
| 7,804,506 B2 | 9/2010 | Bates et al. |
| 7,886,003 B2 | 2/2011 | Newnam et al. |
| 7,930,624 B2 | 4/2011 | Phillips et al. |
| 7,945,857 B2 | 5/2011 | Deutscher et al. |
| 8,020,099 B1 * | 9/2011 | Lu ............................ 715/720 |

(Continued)

FOREIGN PATENT DOCUMENTS

WO        02/054192 A2     7/2002

OTHER PUBLICATIONS

PCT/US2013/050763, International Search Report and Written Opinion, Oct. 31, 2013.

*Primary Examiner* — Angie Badawi
(74) *Attorney, Agent, or Firm* — Kunzler Law Group

(57) ABSTRACT

An apparatus, method, and computer program product are disclosed for synchronizing interactive content with multimedia. A media module is configured to display a multimedia element in a media player capable of multimedia playback. A content module is configured to display one or more interactive content elements associated with the multimedia element. A synchronization module is configured to synchronize the presentation of the one or more interactive content elements with playback of the multimedia element. An input detection module is configured to detect user input in response to a user interacting with the one or more interactive content elements.

19 Claims, 17 Drawing Sheets

(56) References Cited

U.S. PATENT DOCUMENTS

| | | |
|---|---|---|
| 8,166,500 B2 * | 4/2012 | Sakhartov et al. ............. 725/32 |
| 8,201,201 B2 | 6/2012 | Des Jardins |
| 8,473,993 B2 * | 6/2013 | Athias .......................... 725/110 |
| 2007/0006063 A1 | 1/2007 | Jewsbury et al. |
| 2008/0002021 A1 | 1/2008 | Guo et al. |
| 2010/0138852 A1 | 6/2010 | Hirsch et al. |
| 2011/0028207 A1 * | 2/2011 | Gagner .................. G07F 17/32 463/25 |
| 2011/0107385 A1 | 5/2011 | Hudson et al. |
| 2011/0116769 A1 * | 5/2011 | Sugiyama et al. ............ 386/282 |
| 2012/0128334 A1 | 5/2012 | Cheok et al. |
| 2012/0139940 A1 | 6/2012 | Chavanne |
| 2013/0295534 A1 * | 11/2013 | Meiri .......................... 434/157 |

* cited by examiner

FIG. 12

APPARATUS, METHOD, AND COMPUTER PROGRAM PRODUCT FOR SYNCHRONIZING INTERACTIVE CONTENT WITH MULTIMEDIA

CROSS-REFERENCES TO RELATED APPLICATIONS

This application claims the benefit of U.S. Provisional Patent Application No. 61/672,110 entitled "APPARATUS, METHOD, AND COMPUTER PROGRAM PRODUCT FOR SYNCHRONIZING INTERACTIVE CONTENT WITH MULTIMEDIA" and filed on Jul. 16, 2012, for Gary Spirer, which is incorporated herein by reference. This application also claims the benefit of U.S. Provisional Patent Application No. 61/791,191 entitled "APPARATUS, METHOD, AND COMPUTER PROGRAM PRODUCT FOR SYNCHRONIZING INTERACTIVE CONTENT WITH MULTIMEDIA" and filed on Mar. 15, 2013, for Gary Spirer, which is also incorporated herein by reference.

FIELD

This invention relates to displaying multimedia content and more particularly relates to synchronizing interactive content with multimedia playback.

BACKGROUND

In general, multimedia may include static images, motion pictures, sound recordings, etc., which may be consumed on an electronic device, such as a computer, smart phone, etc. Businesses and organizations may take advantage of different multimedia content to advertise their products, market to target groups, etc. In particular, businesses may share present multimedia using a variety of online distribution methods, such as social networks, email, text messages, etc. Traditional multimedia content, however, usually does not allow the user to interact with the content.

It may be desirable to allow multimedia consumers to interact with the multimedia content, which may have advantages for both the consumer and the content creator. A content creator may want to gain feedback about products, gain statistical data about a marketing campaign, etc. from their consumers. Consumers may want a more immersive multimedia experience and may also want to provide feedback on products, advertising, etc., that they consume.

BRIEF SUMMARY

From the foregoing discussion, it should be apparent that a need exists for an apparatus, method, and computer program product to synchronize interactive content with multimedia. Beneficially, such an apparatus, method, and computer program product would allow a content creator to display interactive content during multimedia playback.

The present disclosure has been developed in response to the present state of the art, and in particular, in response to the problems and needs in the art that have not yet been fully solved by currently available multimedia display methods. Accordingly, the present disclosure has been developed to provide an apparatus, method, and computer program product for synchronizing interactive content with multimedia that overcome many or all of the above-discussed shortcomings in the art.

In one embodiment, an apparatus is disclosed that includes a media module configured to display a multimedia element in a media player capable of multimedia playback. In another embodiment, a content module is configured to display one or more interactive content elements associated with the multimedia element. In certain embodiments, a synchronization module is configured to synchronize the presentation of the one or more interactive content elements with playback of the multimedia element. In one embodiment, an input detection module is configured to detect user input in response to a user interacting with the one or more interactive content elements.

In a further embodiment, the apparatus includes a layout module is configured to position the one or more interactive content elements and the multimedia element on a display such that the one or more interactive content elements are positioned one or more of proximate and overlaid relative to the media player. In another embodiment, the input detection module includes a trigger module configured to perform an action in response to user input detected by the input detection module. In a further embodiment, the trigger module performs an action in response to receiving input from one or more of an external and internal cue.

In one embodiment, a scheduling module is configured to play the multimedia element and the one or more synchronized interactive content elements at a future date and time. In another embodiment, an analysis module is configured to analyze and store data collected from the input detected by the input detection module. In certain embodiments, the analysis module creates customized feedback reports, the feedback reports comprising one or more of recommendations, evaluations, assessments, and explanations.

In one embodiment, a metrics module is configured to organize the data collected from the analysis module and create one or more metrics based on the collected data. In another embodiment, an integration module is configured to integrate the data collected by the analysis module with external applications. In certain embodiments, the external applications include one or more of e-commerce systems, customer relationship management systems, email systems, and social media platforms.

The apparatus, in some embodiments, includes a rewards module configured to provide a reward in response to actions detected by the input detection module. The reward, in one embodiment, includes one or more of loyalty points, incentives, discounts, coupons, badges, achievements, bargains, promotions, and offers. In another embodiment, the one or more interactive content elements displayed by the content module includes one or more of survey questions, polls, quizzes, hyperlinked text, hotspots, and buttons that are synchronized to the multimedia element displayed by the media module.

In another embodiment, the apparatus includes an administration module configured to create one or more interactive content elements synchronized with a multimedia element. The administration module, in another embodiment, includes a loading module configured to load and divide a multimedia element into one or more segments. In one embodiment, an editing module configured to create one or more interactive content elements associated with the multimedia element. In certain embodiments, a timing module is configured to synchronize the presentation of one or more interactive content elements with the one or more segments of the multimedia element. In one embodiment, the position and duration of the one or more interactive content elements in the multimedia element is set on a timeline.

In one embodiment, the editing module links one or more different multimedia elements to one or more possible responses to the one or more interactive content elements such that a different multimedia element is displayed based on the response. In another embodiment, the apparatus includes a distribution module configured to distribute the one or more interactive content elements synchronized with the multimedia element.

A method is disclosed that, in one embodiment, includes displaying a multimedia element in a media player capable of multimedia playback on a display. The method, in another embodiment, includes displaying one or more interactive content elements associated with the multimedia element on a display. In another embodiment, the method includes synchronizing presentation of the one or more interactive content elements with playback of the multimedia element. In a further embodiment, the method includes detecting user input in response to a user interacting with the one or more interactive content elements.

In one embodiment, detecting user input in response to the user interacting with the one or more interactive content elements further comprises triggering an action. In another embodiment, the method includes collecting metrics in real-time in response to a user interacting with the one or more interactive content elements. In a further embodiment, the one or more displayed interactive content elements comprises one or more of surveys, quizzes, polls, hyperlinked text, hotspots, and buttons.

In one embodiment, the method includes loading a multimedia element in a media player capable of multimedia playback. In another embodiment, the method includes dividing the multimedia element into one or more media segments. In a further embodiment, the method includes creating one or more interactive content elements associated with the multimedia element. The method, in another embodiment, includes synchronizing the presentation of one or more interactive content elements with the one or more media segments using a timeline interface.

A computer program product is disclosed that includes a computer readable storage medium having computer readable program code embodied therewith. In one embodiment, the computer readable program code is configured to display a multimedia element in a media player capable of multimedia playback. In another embodiment, the computer readable program code is configured to display one or more interactive content elements associated with the multimedia element. The computer readable program code, in another embodiment, is configured to synchronize the presentation of the one or more interactive content elements with playback of the multimedia element. In one embodiment, the computer readable program code is configured to receive user input in response to a user interacting with the one or more interactive content elements.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 12 is an illustration of one embodiment of an interface with an embedded experience in accordance with the subject matter disclosed herein;

DETAILED DESCRIPTION

Figure 1:
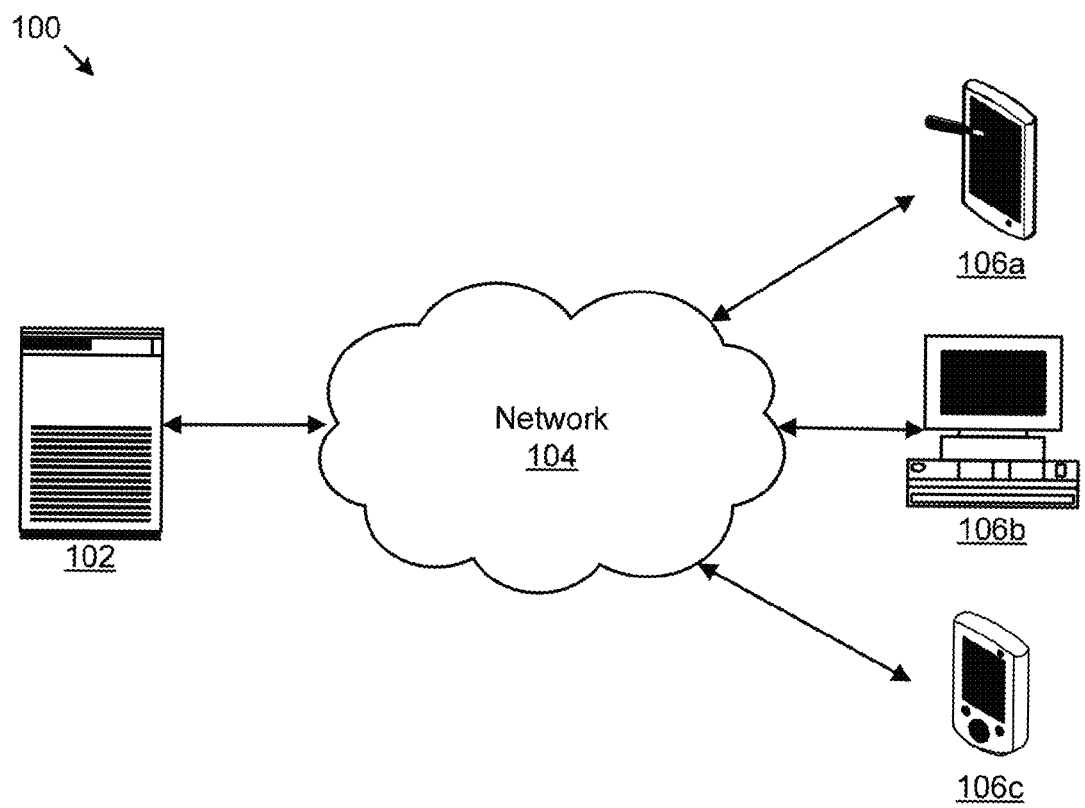
FIG. 1 is a schematic block diagram illustrating one embodiment of system for synchronizing interactive content with multimedia in accordance with the subject matter disclosed herein.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for synchronizing interactive content with multimedia. In the depicted embodiment, the system 100 includes a server 102, a network 104, and a plurality of client devices 106. As used herein, the server may also be configured as a mainframe computer, a blade center comprising multiple blades, a desktop computer, and the like. Although for simplicity one server 102, one network 104, and three clients 106 are shown, any number of servers 102, networks 104, and clients 106 may be employed. One of skill in the art will also readily recognize that the system 100 could include other devices such as routers, printers, scanners, and the like.

The server 102, in one embodiment, may include memory storing computer readable programs and may include a processor that executes the computer readable programs as is well known to those skilled in the art. The computer readable programs may be tangibly stored in storage in communication with the server. The server may host, store, and/or provide a multimedia element synchronized with one or more interactive content elements for access and/or download over the network 104 by the plurality of clients 106.

The network 104 may comprise a global communications network such as the internet, a Local Area Network ("LAN"), multiple LANs communicating over the internet, a wide area network ("WAN"), a cellular network, or any other similar communications network. The network 104 may include hardware such as routers, switches, cabling, and other communication hardware. Each client 106 may be embodied as a desktop computer, a portable computer, a server, a mainframe computer, a handheld computing device, a touch device, a personal desktop assistant ("PDA"), a tablet computer, an eBook reader, a mobile phone, a smart phone, a smart TV, a kiosk, a head-mounted display, smart eyeglasses, smart contact lenses, and the like.

Each client 106 may communicate with the server 102 through the network 104. In one embodiment, a client 106 communicates with the server 102 by way of a program executing on the client 106, such as an internet browser or an application configured to access and/or download multimedia content from the server 102, as is known in the art. In one embodiment, the server 102 may distribute one or more interactive content elements synchronized with a multimedia element such as video, graphics, sound, and text, which may be accessible to the client devices 106 over the network 104. In certain embodiments, the program on the client device 106 allows a user to interact with the multimedia element and/or the one or more interactive content elements by using an input device. The input device may include a mouse, stylus, joystick, controller, and the like. One of skill in the art will recognize other ways for a user to interact with a client device 106.

Figure 2:
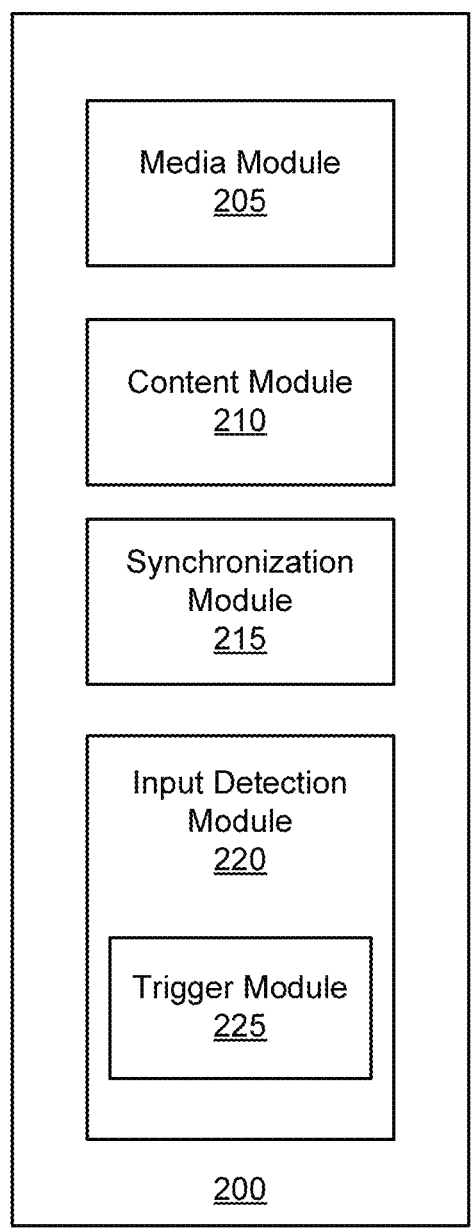
FIG. 2 is a schematic block diagram illustrating one embodiment of an apparatus for synchronizing interactive content with multimedia in accordance with the subject matter disclosed herein.

FIG. 2 is a schematic block diagram illustrating one embodiment of an apparatus 200 for synchronizing interactive content with multimedia. The apparatus 200 includes a media module 205, a content module 210, a synchronization module, 215, an input detection module 220, and a trigger module 225, which are described below.

The media module 205, in one embodiment, displays one or more multimedia elements. As used herein, multimedia may be media content that uses a combination of different content forms, such as text, audio, images, graphics, video, slideshows, animations, documents, and the like. The one or more multimedia elements, in some embodiments, may include, but is not limited to, pre-recorded and/or live-streaming media, timed or untimed media, or the like. In other embodiments, the one or more multimedia elements may include presentations created by a presentation program such as Microsoft PowerPoint, Apple's Keynote, and the like.

Figure 4:
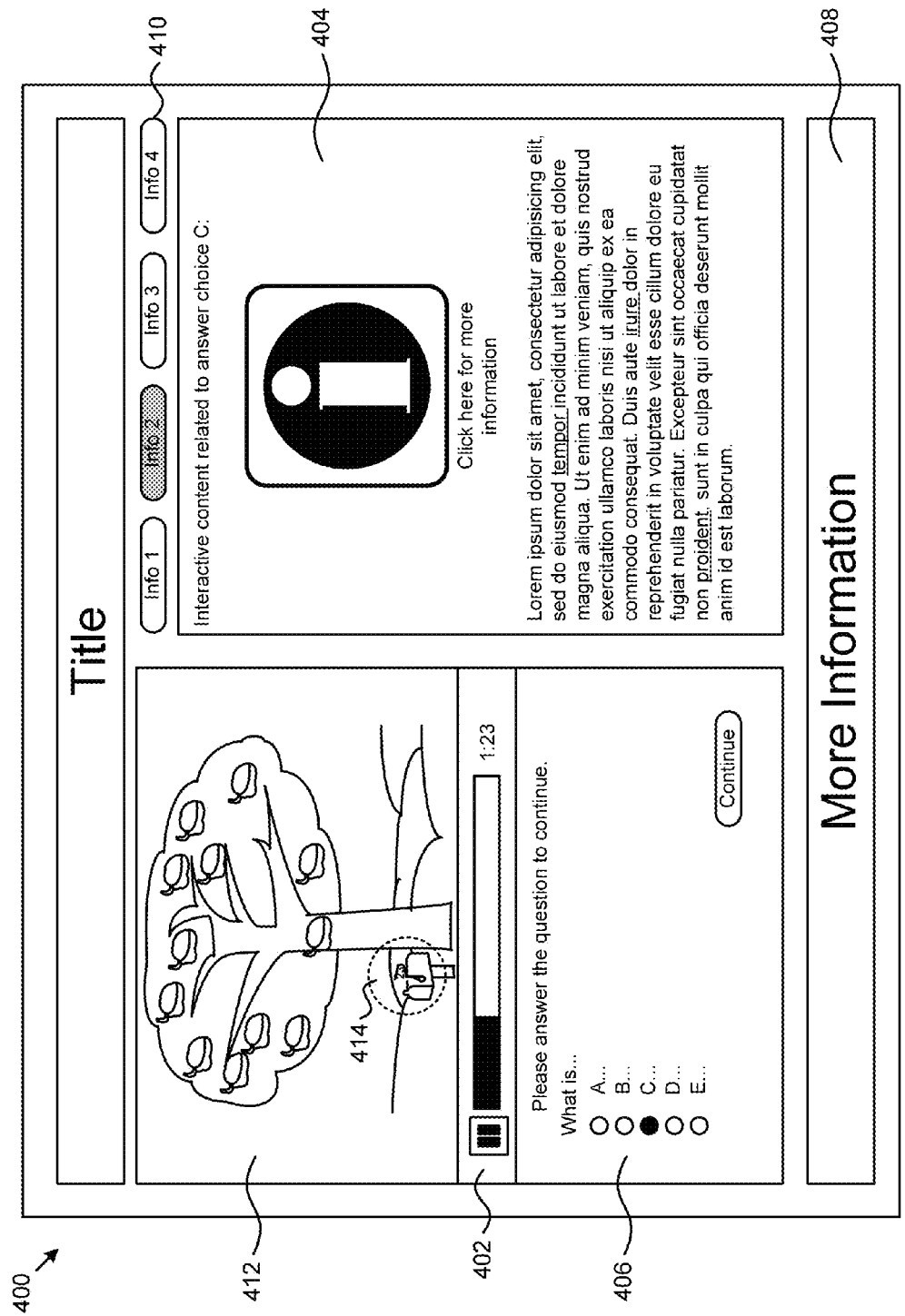
FIG. 4 is an illustration of an embodiment of an interface for synchronizing interactive content with multimedia in accordance with the subject matter disclosed herein.

The media module 205 may present the multimedia content by visually displaying the content on an electronic display of a client device 106. In certain embodiments, the content is presented using a media player 402 capable of multimedia playback, as illustrated in FIG. 4. The media player 402 may be integrated into a client program, such as an internet browser, or may be a standalone application, such as Windows Media Player or QuickTime.

Referring now to FIG. 2, the media module 205 may access a remote server 102 through the network 104 to download a multimedia element for playback in the media player 402. Alternatively, the media module 205, in some embodiments, may access multimedia elements stored on a local computer. For example, the media module 205 may reside on a mobile device that may have one or more multimedia elements stored on the device. The media module 205, in another embodiment, may access live-streaming media from the internet, a television provider, a radio provider, and/or the like, for playback in the media player 402.

The content module 210, in one embodiment, presents one or more interactive content elements associated with the multimedia element displayed by the media module 205. The one or more interactive content elements may include, but is not limited to, text content, audible content, and/or visual content. Text content may include text, audible content may include spoken words, music, sound effects, and/or the like, and visual content may include images, video, graphics, animations, slideshows, presentations, and/or the like.

The content module 210, in one embodiment, displays visual content by presenting the one or more interactive content elements on an electronic display. A user may interact with the one or more interactive content elements displayed by the content module 210 through an input device such as a mouse, stylus, joystick, controller, and/or the like. For example, a user may view interactive content presented on the display of a touch screen device and use a finger and/or stylus to interact with the content.

The one or more interactive content elements displayed by the content module 210, in one embodiment, may include hyperlinked text, graphics, images, buttons, and/or the like. In other embodiments, the one or more interactive content elements may include, but is not limited to, survey questions, polls, quizzes, games, assessments, evaluations, hot spots, and/or the like. As used herein, hot spots may include interactive locations overlaying a multimedia element which allow user interaction. In another embodiment, an interactive content element may include a custom HTML overlay, which presents interactive objects for a user to interact with by, for example, clicking with a mouse, hovering over with a mouse, selecting with a finger, and/or the like. The interactive objects within the custom HTML overlay may link to external locations, such as websites, and/or display different interactive content elements. In further embodiments, the one or more interactive content elements displayed by the content module 210 may overlay the multimedia presented in the media player 402 by the media module 205. In certain embodiments, the one or more interactive content elements may be displayed pre-roll and/or post-roll. For example, a user watching an online video on YouTube® may be presented with one or more survey questions before the video starts and/or after the video is completed.

In yet another embodiment, the media module 205 may embed the media player 402 in a client application, such as an internet browser, by using an embed link encoded in a programming language, such as HTML, PHP, and/or the like. In one embodiment, the "iframe" HTML tag may be removed from the embed code to allow one or more interactive content elements to be integrated into the media player 402. By removing the "iframe" HTML tag from the embed code, the one or more interactive content elements may be discoverable by a web crawler, such as Google®, Yahoo!®, Bing®, and/or the like, which allows the content to be indexed and ranked for search engine optimization ("SEO").

The synchronization module 215 synchronizes the presentation of the one or more interactive content elements displayed by the content module 210 with a multimedia element displayed by the media module 205. In one embodiment, as the multimedia element is playing in a media player, the synchronization module 215 may update the one or more interactive content elements in response to the segment of the multimedia element being presented.

For example, as shown in the embodiment depicted in FIG. 4, a video 412 may be configured to present a user with a question 406 every ten seconds during playback of the video 412 in the media player 402. In this example, the synchronization module 215 may pause the media player 402, present the user with a question 406 that has been prepared beforehand, and wait until the user has answered the question to continue playing the video. In other embodiments, the synchronization module 215 may update other areas of the display 404, 408, 410 that present one or more interactive content elements in response to the current position of the multimedia element being presented.

In a further example, a live-streaming television program may be playing in the media player 402. Intermittently during the live-streaming program, commercial advertisements may be shown that present to the viewer products, services, information, and/or the like. The commercial advertisements, as part of the live-streaming television program, may be synchronized with one or more interactive content elements, such as poll questions, survey questions, trivia questions, quiz questions, and/or the like, which a viewer can interact with in real-time while watching the commercial advertisements. In one embodiment, a viewer watching the live-streaming television program on a television set may interact with the one or more interactive content elements by using an internet connected set-top box such as Google® TV, Apple® TV, and the like. In another embodiment, the live-streaming program, with its one or more synchronized interactive content elements, may be viewed and interacted with in real-time on an internet connected client device 106, such as a "smart TV," computer, mobile device, and/or the like and/or saved for offline viewing on a digital video recorder ("DVR"), computer, mobile device, and/or the like.

In one embodiment, a mobile device and/or smart phone, such as an iPhone or Android-based phone, may host the media module 205 and the content module 210, which are configured to effectively utilize the limited viewing area of the mobile device screen. For example, in one embodiment, a video may be presented on the mobile device by the media module 225. The video may be paused by the content module 210 when an interactive content element, e.g., a survey question, is presented to the user. In some embodiments, the video may be hidden by the media module 205 in order to dedicate the viewing area to the content module 210. In another embodiment, the content module 210 may overlay interactive content elements over the video. The video may reappear, in some embodiments, and continue playback after the user has interacted with the interactive content.

Referring back to FIG. 2, in another embodiment, the synchronization module 215 may employ "question logic" where the synchronization module 215 updates the one or more interactive content elements and/or the multimedia element based on user input. For example, referring again to the embodiment depicted in FIG. 4, survey questions 406 may be synchronized with a video 412 playing in the media player 402. The synchronization module 215 may update the video 412 playing in the media player 402 with a different video in response to a user's answer to a survey question 406. Moreover, a user's answer to the questions 406 may determine how the one or more interactive content elements and/or the multimedia element are updated. In this manner, a content creator may use the synchronization module 215 to customize the interactive and/or multimedia content in real-time by chaining together various content elements, such as videos, graphics, text, and the like, in response to user input.

In one embodiment, the administration module 335, described below with reference to FIG. 3, allows a content creator to upload one or more multimedia elements and link them together based on a user's feedback provided to the interactive content elements. For example, a content creator may upload a series of videos and link different videos to different answer choices for a multiple choice survey question. The user's responses will determine which of the uploaded videos will be displayed. Similarly, in other embodiments, the content creator may link different interactive content elements to different responses provided by the user. In this way, the content creator may design a complex marketing scheme based on the user's responses, which would provide a different experience for each user.

In another embodiment, a content creator may design a response-driven decision making project, such as for an advertising campaign, a real estate project, a business deal, or the like, which would include one or more interactive multimedia content elements. For example, a user may be unsure about the direction to go regarding an advertising campaign for an upcoming product. To help the user solve this problem, the user is presented with a response-driven decision making project that initially presents the user with one or more general advertising options. In one embodiment, a user may be presented with a sample video and asked a series of questions regarding items, ideas, expressions, people, music, and/or the like displayed in the video in order to get a sense of what the user likes and the direction the user wants to go with the advertising campaign. Alternatively, the questions may be designed to determine where to advertise, i.e., social networks, websites, television, radio, and the like, the market to target with the advertising, when to advertise, or the like. In response to the user's responses to the initial questions, a subsequent video may be displayed with more specific questions, and so on. The response-driven decision making project incorporates "question logic" to determine, based on the user's answers, what interactive multimedia content to display next.

Alternatively, for example, a real estate company may have a number of videos that are used for their advertising campaigns. A real estate broker may be presented with one or more questions to determine the type of client the broker is targeting, i.e., questions regarding age, marital status, housing preferences, or the like. Based on the broker's answers, one or more possible advertising campaigns may be displayed that the broker can choose from. In other embodiments, another series of questions may be presented to the broker to help get more specific information from the broker. The broker may additionally select various customized options for the advertising campaign, such as music, video clips, taglines, or the like, which are presented to the broker based on the broker's responses. The broker may then choose where to distribute the selected advertising campaign, such as on a website, social network, mobile network, or the like. Moreover, the broker may choose to share the advertising campaign with just a single client, a group of clients, or an entire community.

In a similar example, a CEO may be struggling with a tough business decision, such as a possible merger, long term investment options, expansion options, or the like. The CEO may be presented with an initial questionnaire, which would create a baseline and drive the next set of questions based on the CEO's responses. The questionnaire may incorporate multimedia elements, such as photographs, audio tracks, videos, or the like. Subsequent questionnaires may include more specific questions based on the CEO's responses to the previous set of questions. The questions may drill down into specific information regarding the CEO's company, such as costs, expenses, forecasts, revenues, profits, assets, and/or the like, in order to provide more specific results and/or options to help the CEO make an informed decision.

Referring now to FIG. 2, the input detection module 220, in one embodiment, detects input from a user interacting with one or more of the interactive content elements, as described above. The input device may include a mouse, a stylus, and the like. One of skill in the art will recognize other ways for a user to interact with a client computing device. In other embodiments, the input detection module 220 includes a trigger module 225 that performs an action in response to input detected by the input detection module 220.

The trigger module 225 may perform an action in response to a user interacting with an interactive content element. The action, in certain embodiments, may include, but is not limited to, displaying a website and/or updating the one or more interactive content elements associated with the multimedia element, such as displaying questions, updating advertisements, updating informative text, and the like. For example, in one embodiment, the trigger module 225 may open a website when a user interacts with hyperlinked text. Other triggers may include, but are not limited to, motions, gestures, finger prints, eye movements, hand movements, accelerometer movements, gyroscopic movements, color vision, proximity sensors, binocular vision, acoustics, voice commands, images, or the like. In other embodiments, the trigger module 225 may respond to motions, gestures, and/or voice commands by live and/or inanimate objects, such as computers, robotic devices, or the like. Other triggers may include external signs and/or symbols, which may be either physical or digital, such as a sign on TV or in a video.

In another embodiment, interactive content presented on a display, such as questions, advertisements, and the like, may be updated by the trigger module 225 in response to a user interacting with an interactive content element. For example, in one embodiment, a user may click on an answer to a survey question 406 overlaying a video 412 playing in a media player 402, as depicted in FIG. 4. The trigger module 225, in response to the user's answer to the survey question 406, may update the one or more interactive content elements 404, 408, 410 associated with the survey question.

In another example embodiment, synchronized interactive content may overlay the video 412 in the form of a video hot-spot 414, which a user may click on to gain more information about the object in the video 412. The trigger module 225 may perform an action associated with the hot-spot, such as updating the one or more interactive content elements 404, 408, 410 and/or opening a website associated with the object. In other embodiments, a user's eye movements may be tracked as he views the multimedia content, which may trigger customized interactive content to be displayed in response to where the user is looking. For example, a user may be viewing a music video and as he looks at different objects within the video, such as clothing, automobiles, musical instruments, and the like, the trigger module 225 may display interactive content associated with those objects. In some embodiments, similar to tracking eye movements, speech and/or gesture inputs may be processed by the trigger module 225 to perform an associated action.

Referring back to FIG. 2, in yet another embodiment, the trigger module 225 may perform an action in response to an external and/or internal cue. An external cue may include signals transmitted from an object that may be used as an interaction device to trigger an action by the trigger module 225. For example, a user may be wearing a pair of running shoes which have an embedded transmitter configured to trigger an action by the trigger module 225 when connected to the embodied apparatus. The transmitter within the user's shoes may communicate specific information about the shoes to the trigger module 225 as it relates to the multimedia content being viewed by the user. If a user is viewing a running video, for example, the transmitter may communicate to the system the user's shoe size, the type of shoe, how long the user has been wearing the shoes, and the like. In this manner, the system may generate real-time interactive content, such as survey questions, polls, advertisements, and the like, customized to the user's preferences and lifestyle.

In another embodiment, a geolocation system, such as a global positioning system ("GPS") system, may also trigger an action by the trigger module 225. The trigger module 225 may collect location information from a user in order to generate one or more custom interactive content elements based on the user's location. For example, as a user walks into a retail store, he may be presented on his mobile device with a video of a store employee welcoming him into the store. The video may present the user with real-time interactive questions regarding the purpose of the user's visit in order to help him find products in the store. In another embodiment, a user may have interactive multimedia delivered to their smart device while they are waiting in line, such as at a grocery store, airport, hotel, or the like, which may be determined by a GPS system. In other embodiments, interactive multimedia content is delivered to a user's smart device while they are on hold during a telephone call.

In some embodiments, the trigger module 225 located on a server may receive the user's location in the store from a GPS system. The trigger module 225 may then query a database for multimedia and interactive content based on the user's location in the store and send this information back to the user through the network 104. The multimedia content may be a video that recommends products and/or presents product reviews. Alternatively, the user may be presented with customized rewards while in the store, such as offers and promotions, for performing reward-based actions in the store, as described below. In other embodiments, the user's location may be dynamically tracked as the user moves through the store, triggering interactive content, such as coupons, product reviews, and the like, based on the user's location.

In another embodiment, the trigger module 225 may receive an electronic message from a user to trigger an action. The electronic message may include a text message, an email message, a digital voice message, or the like. In one example, as illustrated in FIG. 15B, a store may post an advertisement 1512 that says, "Text COUPON to 55555 to get 15% off of your purchase." In response to the user texting 1514 the word "COUPON" to the specified number on their mobile/smart device, the trigger module 225 sends a reply message 1516. The reply message may include interactive multimedia content 1518, such as a video, quiz, survey, game, or the like. In another embodiment, the reply message includes a link to the interactive multimedia content. In order to receive the discount, the user would have to playback the multimedia content and perform some action associated with the interactive content elements, such as answer survey questions, fill-out a lead capture form, play a game, or the like. The user would then be sent a coupon 1520, via an electronic message, to use in the store.

Figure 15A:
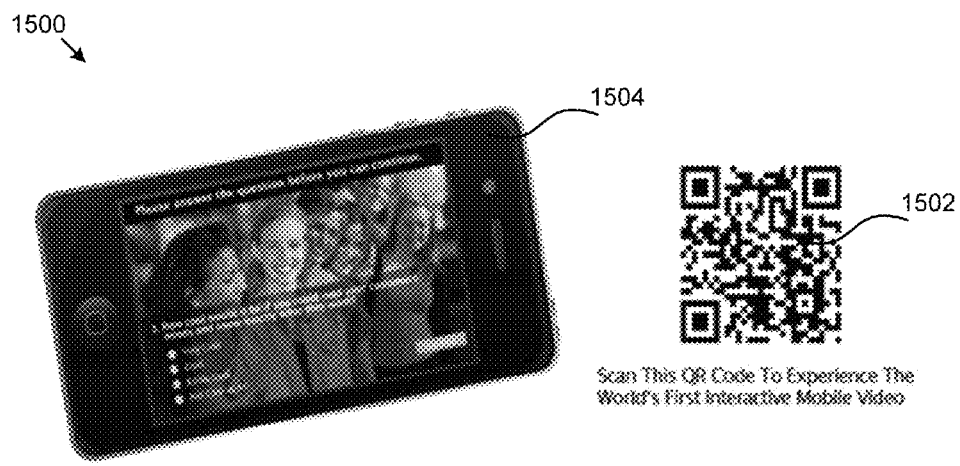
FIG. 15A is an illustration of an embodiment using a QR code reader in accordance with the subject matter disclosed herein.
Figure 15B:
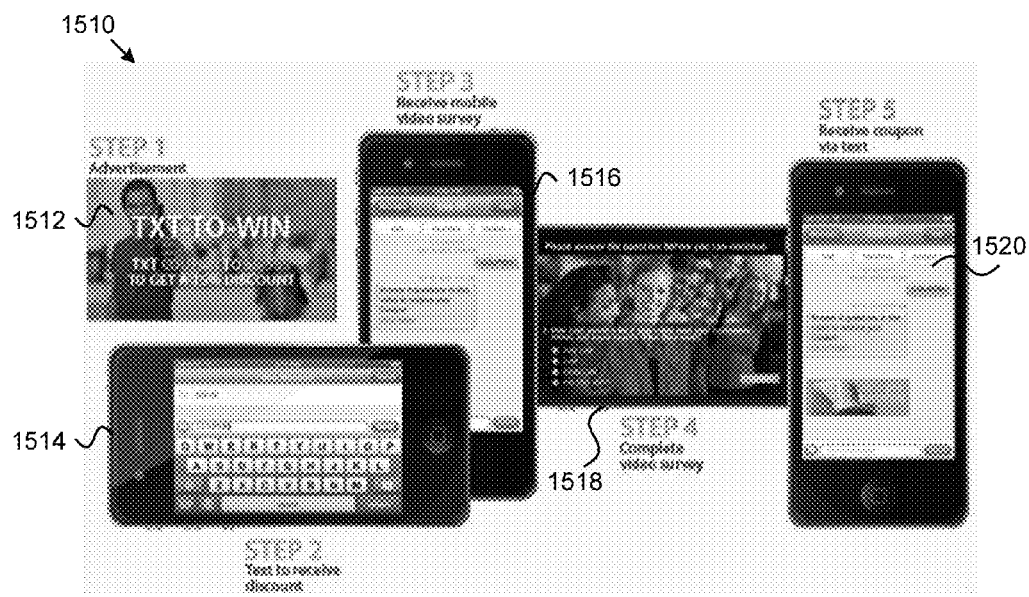
FIG. 15B is an illustration of an embodiment using text messages in accordance with the subject matter disclosed herein.

In another embodiment, the trigger module 225 may trigger an action in response to a user scanning a quick-response ("QR") code 1502 with a device capable of reading QR codes, such as a smart phone or tablet, as illustrated in FIG. 15A. In yet another embodiment, the trigger module 225 may trigger an action in response to a "near field" communication ("NFC") request. One of skill in the art will recognize other technologies, in light of the present subject matter, that act as a bridge between static marketing content and an electronic device. For example, a user may scan a QR code 1502 printed on an advertisement promoting a discount at a retail store, a hotel, a sporting event, an airport, or the like. In response to scanning the QR code, the trigger module 225 sends an interactive multimedia element, such as a video survey, via a text message and/or email message to the smart device 1504. The user may then receive a promotional incentive in response to playing the multimedia content and providing one or more responses to the one or more interactive content elements.

Referring to FIG. 2, in one embodiment, the trigger module 225 may update the one or more interactive content elements in response to audible words associated with a multimedia element. For example, a user may be presented with a video displaying an automobile advertisement. The advertisement may include a narrator that audibly describes the various features of the automobile while images or videos of the features are displayed. The trigger module 225 may update the one or more interactive content elements in response to cues from the narrator's spoken words. Thus, as the narrator describes the interior options on different models, for example, the trigger module 225 may update the one or more interactive content elements to display text and/or images describing the different interior options in response to an audible cue, such as the word "interior," as spoken by the narrator.

In yet another embodiment, the trigger module 225 may present multimedia and/or interactive content elements on a device in response to a product being purchased with said device. For example, mobile devices, such as smart phones, may be used to purchase items at a point of sale by scanning a code and/or device, using "near field" communication between devices, and/or the like, which may debit a user's account or apply the balance to a credit card. The trigger module 225, in response to a product purchased in this manner, may present to the user multimedia and/or interactive content, such as survey questions, rewards, and/or the like (e.g., a "thank-you" video from the store accompanied with coupons which may be applied to future visits). In another example, a user may be watching a commercial advertisement on a smart TV. The smart TV may allow the user to use a device, such as a smart phone or tablet computer, to communicate with the TV to purchase the product. Again, in response to the purchase, the trigger module 225, may present multimedia with synchronized interactive content to the client device used to purchase the product. In other embodiments, a user may be presented with related products and/or services from a partner vender, in response to a purchase. The affiliated partner may then be provided with data regarding the purchase, such as referral information from the consumer, by the trigger module 225.

Figure 3:
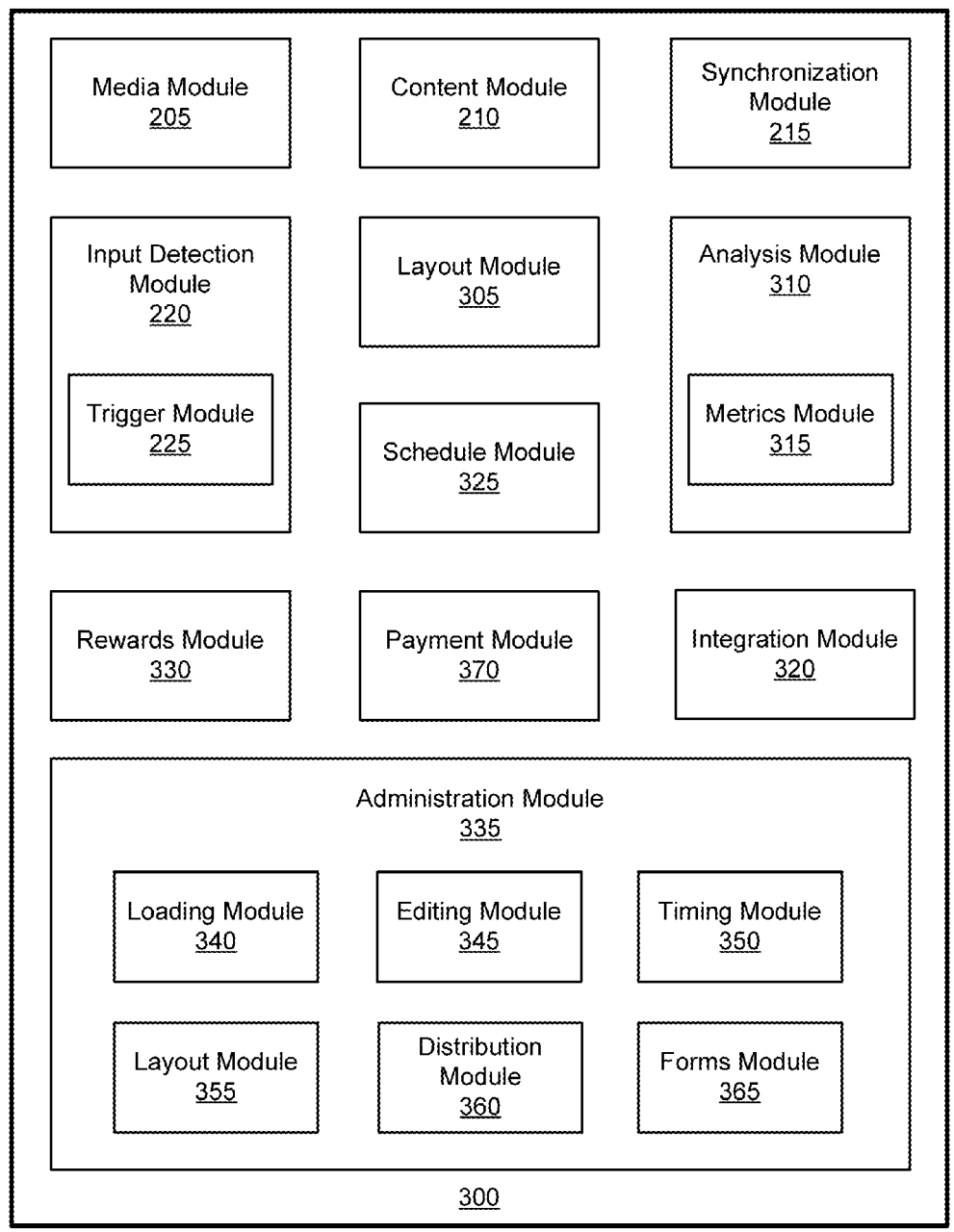
FIG. 3 is a schematic block diagram illustrating another embodiment of an apparatus for synchronizing interactive content with multimedia in accordance with the subject matter disclosed herein.

FIG. 3 depicts another embodiment of an apparatus 300 for synchronizing one or more interactive content elements with a multimedia element. The description of the apparatus 300 refers to elements of FIGS. 1 and 2, like numbers referring to like elements. The depicted apparatus 300 includes a media module 205, a content module 210, a synchronization module 215, an input detection module 220, and a trigger module 225, wherein these modules may be substantially similar to the like numbered modules in FIG. 2. Further, the apparatus 300 includes a layout module 305, an analysis module 310, which includes a metrics module 315, an integration module 320, a schedule module 325, a rewards module 330, and a payment module 370.

In some embodiments, the apparatus 300 may include an administration module 335. The administration module 335 includes a loading module 340, an editing module 345, a timing module 350, a layout module 355, a distribution module 360, and a forms module 365. The apparatus 300 as depicted may be implemented in various industries including, but not limited to, government, medical, health care, commercial, retail and gaming. The embodied apparatus 300 may also be integrated into several systems, such as training, e-learning, assessment, catalogue, presentation, entertainment, point of sale, e-commerce, and/or advertising. In other embodiments, the apparatus 300 may be located on various systems in a myriad of industries, including, but not limited to, financial services, venture funding, crowd funding, health care, emergency services, and/or the like. In other embodiments, the apparatus 300 may be integrated into chat services, such as instant messenger, Skype, AIM, and/or the like.

Moreover, while the depicted embodiment includes the above listed modules, in certain embodiments, the apparatus 300 may include a subset of the depicted modules alone and/or in various combinations.

In one embodiment, the layout module 305 positions the multimedia element displayed by the media module 205 and the one or more interactive content elements displayed by the content module 210 on a display. In certain embodiments, the one or more interactive content elements displayed by the content module 210 may be displayed proximate the multimedia element displayed by the media module 205, which may be above, below, left, and/or right in relation to the position of the multimedia element. In another embodiment, the layout module 305 may overlay the one or more interactive content elements over the multimedia element being displayed by the media module 205. The layout module 305, in other embodiments, may display the one or more interactive content elements displayed by the content module 210 both proximate and overlaying the multimedia element displayed by the media module 210.

The analysis module 310 collects data in response to user input detected by the input detection module 220. The data collected by the analysis module 310 may be stored in a database on a local server or remotely in a cloud computing environment, such as Amazon's Simple Storage Service ("S3"). The analysis module 310, in one embodiment, may use the collected data to provide the user with real-time customized analysis, evaluations, recommendations, reports, and the like, in response to the user's interaction with the one or more interactive content elements. Various statistical analyses may be performed on the data including cross tabulations, optimization analyses, pattern analyses, tracking analyses, business intelligence analyses, and/or the like. In certain embodiments, where the one or more interactive content elements include questions, the analysis performed by the analysis module 310 may be performed on a per question basis and/or for the entire question set.

For example, in one embodiment, a user may view a training and/or assessment video displayed by the media module 205 with associated interactive questions displayed by the content module 210. The interactive questions may be synchronized with the video by the synchronization module 215 so that the questions are shown at predetermined segments of the video. At the end of the video, the user may be presented with an overall score and/or an evaluation report created by the analysis module 310 describing the performance for each question. In some embodiments, the analysis module 310 may produce certifications such that a user may become certified in a certain subject, earn badges and/or achievements, earn points, and/or the like, if the user answers a predetermined number of questions correctly during playback of the training and/or assessment video.

In another example, a user may purchase an online training course that includes multimedia content with synchronized interactive content. The user would be given a username and password, which would allow access to a dedicated membership site containing their training/certification videos, quizzes, surveys, and/or the like. The user would view the training videos and answer the assessment questions as they are presented before, during, and/or after the video. Their answer history, progress, and contact information would be tracked and analyzed by the analysis module 310 to determine when the user achieved a successful pass rate and when to move the user on to more difficult certification trainings.

A similar example would be in a commercial setting where a user is presented with a video and is asked to compare products, rank products, provide reviews, or the like, regarding products displayed in the video. At the end of the video, in one embodiment, the user may be given a list of recommendations created by the analysis module 310 in response to the user's answers to the questions presented during the video. In certain embodiments, the analysis module 310 may display different forms of multimedia and/or interactive content within the generated reports and recommendations, such as video, audio, text, and the like.

In another embodiment, the analysis module 310 assigns cookies to the user based on their responses to the interactive content elements, such as their answers to survey questions or product reviews. Third party websites and applications may use the cookies to provide targeted advertising, marketing promotions, offers, discounts, and the like, to the user based on their responses. For example, based on a user's positive product review of a mountain bike found in a cookie assigned to the user, Google would provide advertising directed toward mountain bikes and accessories related to the product that received the positive review in their search results when the user performed a Google search.

In other embodiments, the analysis module 310 processes pre- and post-purchase data, including feedback provided by the user and purchasing behavior. In one embodiment, purchase data may be accessed by scanning a QR code printed on a receipt. The QR code, in some embodiments, may contain metadata associated with the recent purchase, such as a receipt identifier, store identifier, the UPC codes of the items purchased, or the like. Scanning the QR code located on the receipt, in other embodiments, may deliver interactive multimedia content to the user's device, such as a website, text message, or the like, that is specific to the store where the receipt was printed. The analysis module 310, in one embodiment, may use the receipt metadata to track the purchasing behavior of the user and analyze the collected data, in addition to the data generated by the user's responses to the interactive content, such as a survey, quiz, game, or the like. The user, in other embodiments, may have a tag associated with their membership account, such that the user's tag may be sent to external systems associated with the membership site. For example, when a user successfully completes a training module, the user's tag may be forwarded to automated marketing sites, customer relationship management systems, and/or similar systems to provide personalized content for the user.

In other embodiments, the analysis module 310 provides artificial intelligence learning capabilities. In one embodiment, the analysis module 310 learns by analyzing responses to an interactive multimedia provided by a user. The analysis module 310 may then intelligently respond to the user with more personalized interactive multimedia content, such as targeted video surveys, quizzes, polls, assessments, games, product suggestions, and the like. Further, based on an analysis of the provided responses, more personalized rewards, incentives, offers, promotions, or the like, may be presented to a user in response to the user completing a survey, quiz, poll, or the like. In one embodiment, the analysis module 310 continually refines and adjusts the content of the responses provided to a user based on the user's responses to the interactive content.

The analysis module 310, in some embodiments, may include a metrics module 315. The metrics module 315 may further analyze the data collected by the analysis module 310 to generate one or more multimedia metrics, audience metrics, brand metrics, and the like. Multimedia metrics may include the number of views, viewed minutes, completion rates, social shares, click-through rates, ad-clicks, and the like. Audience metrics may include a number of demographic statistics, such as the number of unique viewers, age, gender, marital status, and the like. Brand metrics may include statistics associated with products such as brand awareness, favorability, purchase intent, recall, and the like. In other embodiments, psychographic metrics may be collected, including, but not limited to, personality, attitudes, values, interests, lifestyles, and the like. In certain embodiments, an interactive content element may include a sentiment meter, which may be configured to gauge a user's feelings and/or emotions at certain points during playback of a multimedia element, as would be recognized by one skilled in the art. For example, a sentiment meter may be used to collect emotional data from a user regarding products in a video. Alternatively, a sentiment meter may be used to assess how an audience feels at different points during a business pitch. This would provide a content creator with real-time behavioral and emotional feedback and/or metrics.

In another embodiment, the metrics module 315 may provide a dashboard interface summarizing the various statistics and metrics collected. The interface may include pie charts, bar charts, line graphs, matrixes, tables, and the like that graphically depict one or more metrics generated by the metrics module 315. In one embodiment, the metrics module 315 may include an export function that exports the collected metrics, or a subset of the collected metrics, to different file formats, such as a comma-separated values file ("CSV"), a portable document format file ("PDF"), and the like, to be used by other applications, such as a spreadsheet program, a statistical package program, and the like. One of skill in the art will recognize various file formats which may be used for exporting data.

In one embodiment, the apparatus 300 may include an integration module 320. The integration module 320 integrates the data collected and stored by the analysis module 310 with external applications such as customer relationship management ("CRM") systems, e-commerce systems, statistical software packages, email systems, marketing systems, and the like. In another embodiment, the integration module 320 tags, filters, and/or segments, in real-time, collected data that may be pushed to external systems. For example, an external CRM system may have an automated marketing response function that will automatically send a text message, email, and/or the like based on a tag. The tag may be a customizable keyword or term associated with a piece of information. The CRM system may be integrated into the embodied system by the integration module 320, which may send the CRM system data collected from the embodied system with its associated tags. The CRM system, upon receiving the data, and its associated tags, may trigger one or more automated marketing responses. In another example, upon receipt of a user's tag, a user's membership site may be customized with new content and/or features.

In a further example, a content creator may want to send a "thank-you" email to any person who watches a video. The integration module 320 may tag the user, based on metrics collected by the metrics module 315, and an external email system may receive the data and/or tag in real-time. The email system, based on the data and tag received, can customize the email message, recommend products, provide product promotions, and/or the like to send to the user. Further, in some embodiments, the external system may include a short message service ("SMS") system, an e-commerce system, and/or other external systems that include automated marketing response functions.

Some embodiments of the apparatus 300 may also include a rewards module 330. The rewards module 330 may provide loyalty points, incentives, discounts, coupons, badges, achievements, bargains, promotions, offers, and the like for a user's participation in a survey, poll, quiz, game, assessment, training, and the like. The rewards module 330 may customize the rewards offered in response to a user's interaction with the one or more interactive content elements. For example, in one embodiment, a retailer may present to a user a video with synchronized interactive survey questions regarding the products in the video. As a user answers the questions, the analysis module 310 may use the answers as a reference to find products in a product database in order to create customized product recommendations in real-time.

Alternatively, the rewards module 330, using the information gathered from the analysis module 310, may generate customized product promotions and/or coupons. The rewards module 330, in various embodiments, may use the demographic and/or psychographic metrics collected by the metrics module 315 to offer a user customized rewards based on variables such as a user's interests, activities, opinions, age, gender, and the like. The customized rewards may include, but are not limited to, loyalty points, frequent flyer points, coupons, gift certificates, promotions, and the like based.

In other embodiments, the rewards module 330 may provide rewards for a user's participation in rewards-based actions, such as providing an email address, buying a product, repeating a purchase, reviewing products, recommending products, advertising products, and the like. For example, a user in a retail store may be provided with coupons and/or promotions based on the user's location in the store. A GPS system may be used to determine the user's location relative to products displayed in the store. As a user approaches rewards-eligible products, the rewards module 360 may present to the user, on a client device 106 such as a mobile device, smart phone, and the like, one or more rewards for performing an action associated with the product, such as purchasing the product, writing a review, advertising the product, and the like.

In yet another embodiment, a schedule module 325 may be provided to schedule playback of the one or more interactive content elements synchronized with the multimedia element. In one embodiment, for example, an entrepreneur may be trying to collect investment capital using crowd funding. The entrepreneur creates a webinar video with interactive content that may be available online for viewing. A potential investor may schedule a more convenient time to watch the video in return for registering their name, phone, email address, and the like, with the website.

The schedule module 325, in one embodiment, also allows the potential investor to set an alert telling the system to remind him about the webinar before the scheduled time. In other embodiments, the schedule module 325 may also allow the user to invite others to the webinar through their social media site (e.g., Facebook "friends"), email invitations, or the like. The webinar video may be synchronized with the same types of interactive content discussed above, which provides more interactivity and data collection than would be provided with traditional webinar systems. In this manner, a user is able to reach a large number of people with their pitch, while also gaining valuable real-time feedback through the user's interaction with the synchronized interactive content.

Certain embodiments of the apparatus 300 may also include an administration module 335. The administration module 335 provides an interface that allows a content creator to load and segment a multimedia element, edit one or more interactive content elements, and synchronize the one or more interactive content elements with the one or more segments of the multimedia element. The administration module 335 provides a streamlined content creation interface such that a content creator does not have to switch between windows, interfaces, and the like in order to load, edit, and synchronize the one or more interactive content elements with the multimedia element. In one embodiment, the administration module 335 creates an account associated with a content creator such that a content creator may need to provide credentials, such as a username and/or password, to login to their account. The administration module 335, in other embodiments, associates preferences, uploaded content, created content, or the like, with the content creator's account.

In some embodiments, the administration module 335, is located on a mobile device, such as a smart phone, and is formatted to be easily used on the mobile device. Thus, any of the modules associated with the administration module 335, such as the loading module 340, editing module 345, layout module 355, distribution module 360, and/or the like. In some embodiments, the content creator, using the administration module 335, has the ability to create multimedia content on a mobile device, such as capturing video on a smart phone, adding interactive content to the multimedia content (e.g., surveys, polls, quizzes, or the like), syncing the interacting content to the multimedia content, and distributing the multimedia and interactive content (e.g., by sending a hyperlink, sharing on a social network, sending an email, sending an SMS, or the like). In this manner, a content creator may easily create and share interactive multimedia content from almost anywhere using a mobile device.

Figure 17:
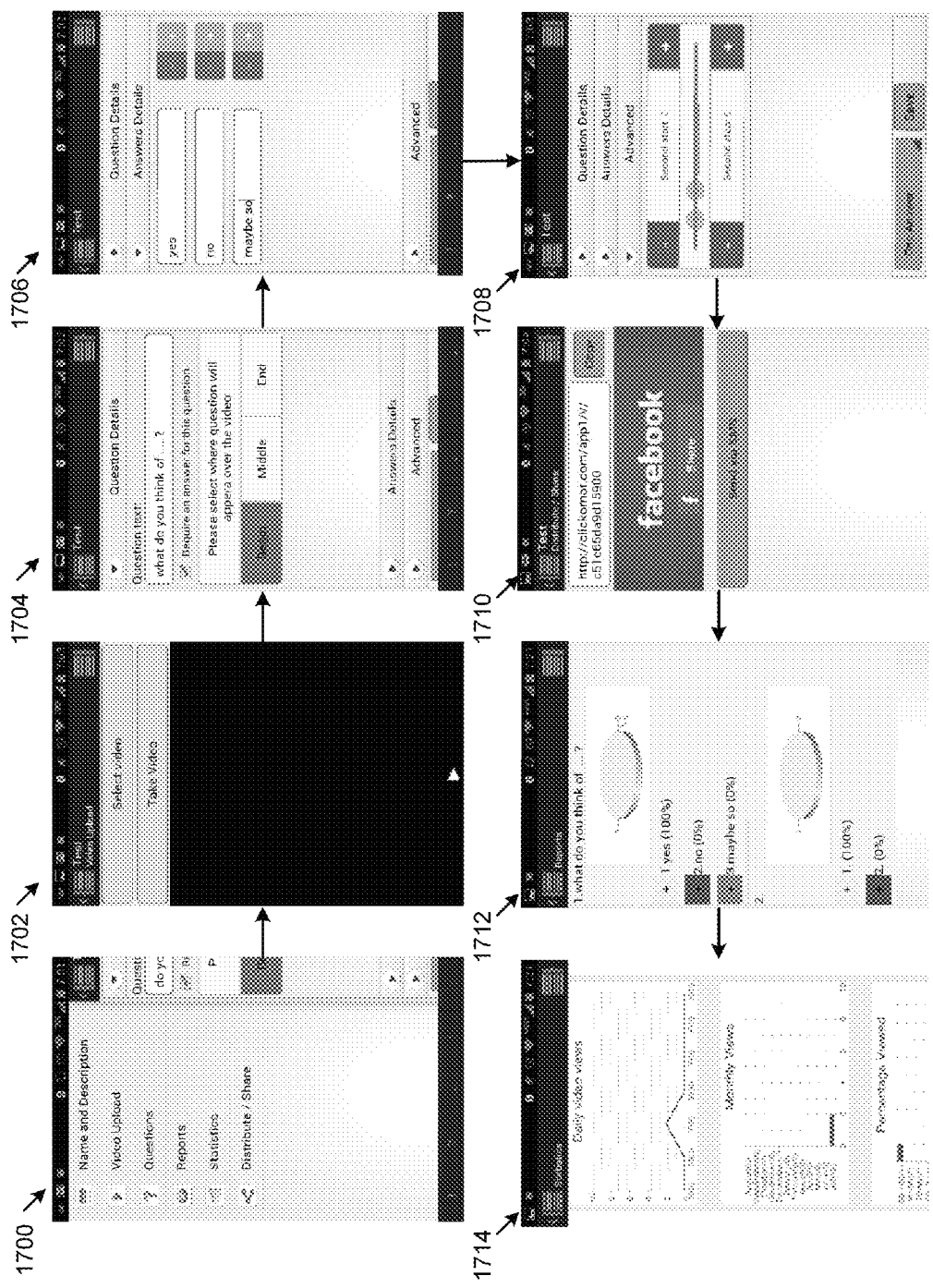
FIG. 17 is an illustration of an embodiment of the system on a mobile device in accordance with the subject matter disclosed herein.

In one embodiment on a mobile device, as depicted in FIG. 17, the administration module 335 presents a menu 1700 of content creation options to the content creator. The content creator may select (e.g., by touching with a finger) to upload a video and/or image, or capture a video and/or image, using a multimedia loading interface 1702 presented by the loading module 340. The content creator may also create interactive content, such as creating one or more questions using a question creation interface 1704, creating one or more answers associated with the questions using an answer creation interface 1706 and syncing the interactive content with the multimedia content using a syncing interface 1708. A distribution module 360, described below, may distribute the interactive multimedia content to one or more destinations selected by the content creator on a distribution interface 1710, such as one or more social networks, text message recipients, email recipients, or the like. In another embodiment, the content creator may view reports on a reporting interface 1712 and/or statistics on an analytics interface 1714.

The loading module 340 loads a multimedia element, such as a video, presentation, slideshow, audio file, and the like, into a media player capable of multimedia playback. In one embodiment, the multimedia element may be uploaded to a server where the administration module 335 is located. Alternatively, the loading module 340 may load a multimedia element hosted on a media website such as YouTube, or on a cloud server such as Amazon's® S3 service. The loading module 340, in some embodiments, divides the multimedia element into one or more media segments.

In one embodiment, the loading module 340 loads multiple multimedia elements that may be used, for example, for video branching or "question logic" as described above. Video branching, as used herein, allows the content creator to string together multiple video clips based on a user's responses. For example, the content creator may ask a question with three possible responses, each associated with a different video clip based on the user's selection.

Figure 10:
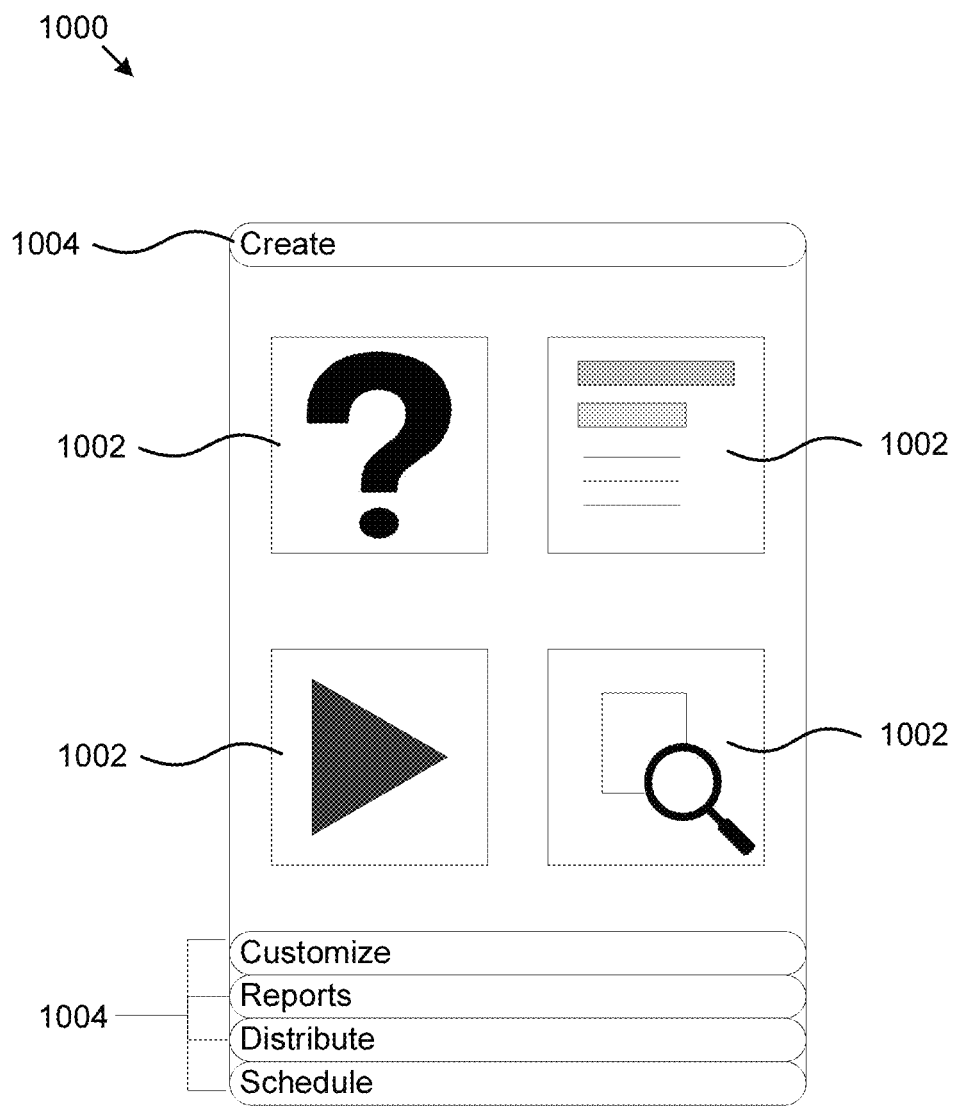
FIG. 10 is an illustration of another embodiment of an interface for creating synchronized interactive content with multimedia in accordance with the subject matter disclosed herein.

The editing module 345 provides a content toolkit 1000, as shown in the embodiment depicted in FIG. 10, which allows a content creator to create and/or edit one or more interactive content elements. In one embodiment, the toolkit 1000 includes one or more customization tools 1002 which allow the content creator to customize the one or more interactive content elements associated with the multimedia element. The one or more customization tools 1002 in the toolkit 1000, in some embodiments, may be arranged in categories 1004, where each category 1004 contains similar customization tools 1002. In certain embodiments, the categories 1004 of the content toolkit 1000 may be arranged in an accordion such that each category may expand and collapse in response to user input, showing and/or hiding the one or more customization tools at the same time.

For example, in one embodiment, the content toolkit 1000 may include categories 1004 such as "Create," "Customize," "Distribute," and "Reports." The "Create" category may be expanded, displaying the one or more customization tools 1002 within the category, where each tool is represented by an icon. The content creator may then click on the "Reports" category, which would expand the category to display the one or more reporting tools, while at the same time collapsing the "Create" category. In some embodiments, all the categories 1004 may be expanded to display all the available customization tools 1002. Alternatively, only one category 1004 may be expanded at a time while the other categories 1004 remain collapsed until interacted with by the user.

Referring back to FIG. 3, the timing module 350 synchronizes the one of more interactive content elements with the one or more segments of the multimedia element. In certain embodiments, the timing module 350 provides an interface with a timeline component that may synchronize one or more interactive content elements with the one or more segments of the multimedia element. The timeline component, in some embodiments, assigns the position and/or duration of the one or more interactive content elements associated with the multimedia element.

Figure 9:
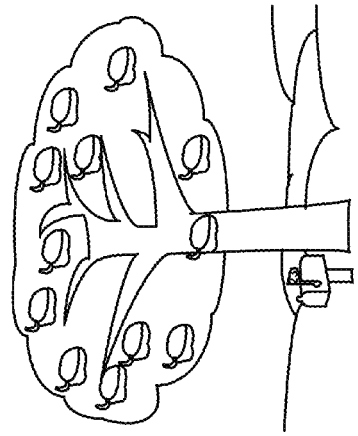
FIG. 9 is an illustration of an embodiment of an interface for creating synchronized interactive content with multimedia in accordance with the subject matter disclosed herein.

For example, as shown in the embodiment depicted in FIG. 9, a content creator may link to a video hosted on YouTube®. The loading module 340 may load the video 904 into a media player capable of multimedia playback 902. The loading module 340 may also divide the video into one or more segments. The content creator may create a plurality of multiple choice survey questions 906, using the editing module 345. The multiple choice survey questions 906 may be synchronized with different segments of the video 904 and displayed during playback of the video 904. After loading the video 904 and creating one or more survey questions 906, the content creator uses the timing module 350, with its associated timeline component 908, to assign the survey questions 906 to one or more segments in the video 904, setting when the survey questions 906 will be displayed and for how long (e.g., Question 1 will be displayed after the video has been playing for 25 seconds and will be displayed for 5 seconds).

Figure 16:
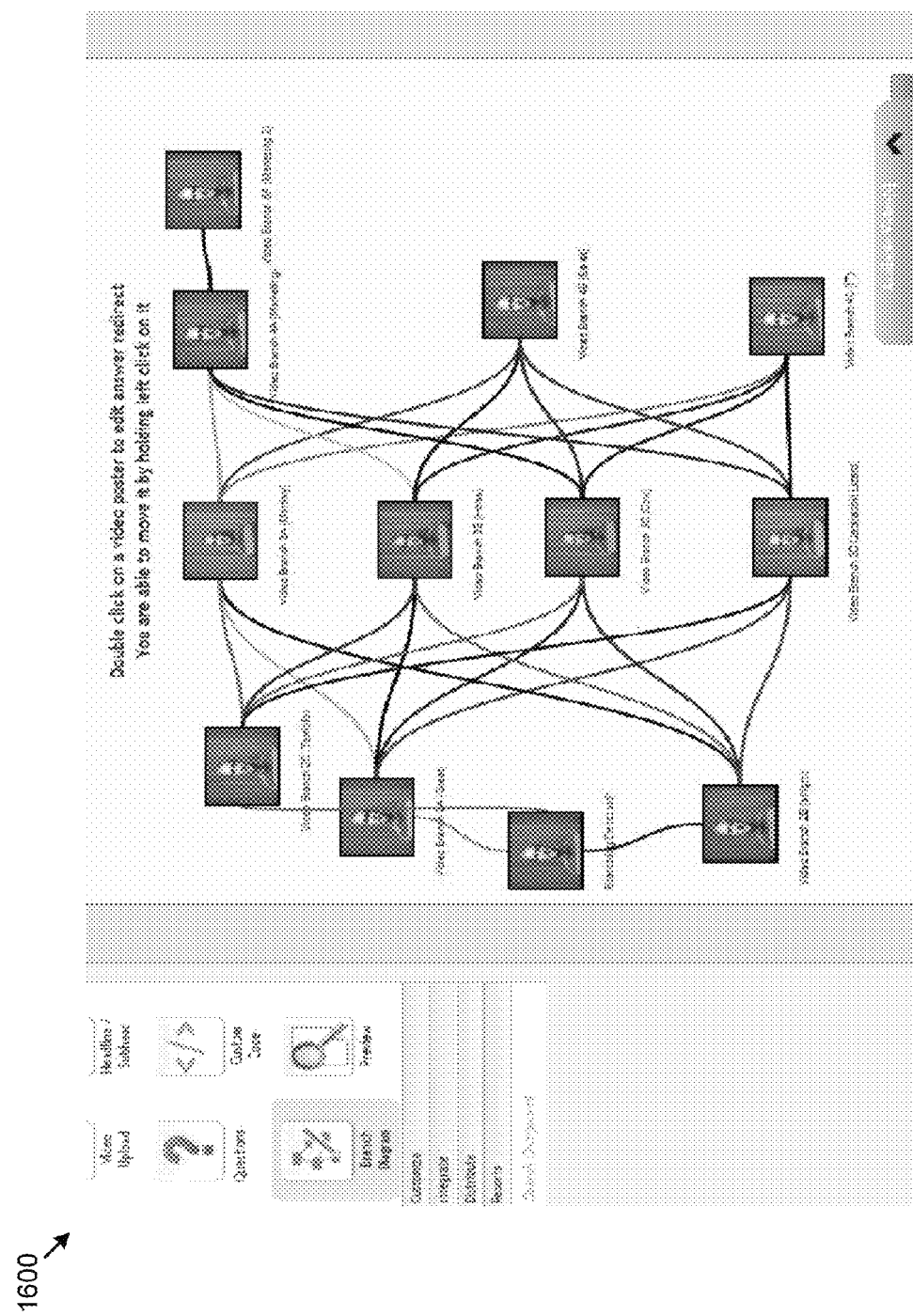
FIG. 16 is an illustration of an embodiment of a branching graph in accordance with the subject matter disclosed herein.

In some embodiments, the content creator may utilize video branching to link 910 the video (or any other multimedia element) to a different video based on the user's responses. In one embodiment, the content creator may also link to position within the same video. As shown in the branching graph 1600 of FIG. 16, the content creator may create many multimedia paths for a user to go through based on the user's responses. In one embodiment, the editing module 345 displays the branching graph 1600 to provide a quick overview of the multimedia branching provided in their interactive multimedia project. In the depicted embodiment, a plurality of video clips are linked together based on the user's responses. The branching graph 1600, in some embodiments, is interactive, which allows the content creator to edit the links and change the order of the multimedia branching. In certain embodiments, the video path selected by a user may be saved, such that a final video incorporating the selected video clips may be shared with others by, for example, a social network, SMS, email, and/or the like.

In another embodiment, the editing module 345 creates multimedia content, such as videos, audio tracks, slideshows, and the like. In a further embodiment, the editing module 345 creates a video from static content uploaded by a content creator, such as one or more photographs, documents, and the like. In one embodiment, the editing module 345 provides screen capture capabilities such that a content creator may record a series of screen shots from a computer interface. For example, a content creator may create a tutorial for using a software product by recording a series of computer interface screen shots demonstrating the product being used. In another embodiment, the content creator may add audio tracks, voice over tracks, or the like, to the created multimedia content. As with multimedia content that is uploaded, interactive content elements, such as survey questions, call to action buttons, hot spots, lead capture forms, and/or the like, may be added to and synchronized with the created content.

In one embodiment, the editing module 345 creates a community feedback service where a user may solicit feedback from one or more persons by overlaying one or more questions, a poll, a quiz, or the like, on a multimedia content element. For example, a user shopping for a shirt in a clothing store may want to ask his friends whether he should buy the green shirt or the blue shirt. The user may take a picture of both shirts with his smart phone and overlay questions that he creates, such as "Should I buy the blue or green one?" The user, in one embodiment, sends the picture with the interactive content elements to one or more of his friends. In another embodiment, he posts the interactive multimedia content on his social network. In a further embodiment, he creates a poll to determine how many people think he should buy the green or the blue shirt. The results of the poll may be kept private, in one embodiment, or, in a different embodiment, the results may be shown to everyone in real time. Alternatively, companies may use this to gain feedback regarding packaging, product design, or the like. For example, a company may post one or more pictures or videos, with surveys, polls, or the like, overlaying the content to solicit feedback from one or more persons.

The editing module 345, in yet another embodiment, creates an interactive video blog that can incorporate user reviews and be shared on various social networks. For example, a user may create a video blog covering a recent visit to a restaurant. The user may create one or more interactive content elements, such as a survey, poll, open-ended questions, or the like, and synchronize the interactive content with the video review. The video blog and the users' responses to the interactive content elements, in one embodiment, may be shared on one or more social sites, such as Yelp®, Facebook®, YouTube®, or the like. Similarly, a user may create a video blog of a product and incorporate interactive content to gain other's feedback regarding the product. In one embodiment, the feedback collected is posted on the site where the product was purchased, such as Amazon®, or on a similar site where the product is listed for sale.

In another embodiment, the editing module 345 receives voice commands and/or input from the content creator. For example, a content creator may create a series of survey questions, quiz questions, assessments, and/or the like using voice input. The editing module 345 may receive the voice input and use voice recognition software to translate the voice input into text. Similarly, the editing module 345 allows a content creator to select an option to receive voice input from a user when a user interacts with an interactive content element. For example, a user may respond vocally to a survey question, instead of typing an answer or clicking on an answer choice, if the content creator has selected a voice input option.

In certain embodiments, the editing module 345 may also be used by the content creator to produce static interactive content elements that may not necessarily be synchronized with the multimedia element, such as advertisements, social media links, external website links, and the like. In other embodiments, the editing module 345 creates incentives, such as coupons, offers, discounts, or the like, and may assign the created incentives to a multimedia element loaded by the loading module 340. For example, a content creator may customize a coupon for a 15% discount in a store and choose a distribution method, such as SMS/text message, email, social media, digital voice, or the like. Thus, as described above, a user may receive the coupon if he replies using the distribution method of choice, such as text message, views the multimedia content, and responds to the interactive content elements.

In some embodiments, the editing module 345 creates incentives based on a user's loyalty point program, frequent flyer program, or other type of loyalty program. In one embodiment, a content creator may select an option to provide a loyalty program incentive by allowing a user to connect to the user's loyalty program such that after a user interacts with the interactive multimedia content, the user may enter their loyalty program credentials to receive the offered promotion. In another embodiment, the content creator may select a predefined keyword to be assigned to the incentive, such as "coupon," "discount," or the like, which the user would need to use in their electronic message to receive the discount.

The editing module 345, in some embodiments, may create batch coupon codes, which a content creator may use for their user incentives. In other embodiments, the content creator may upload a list of pre-generated coupon codes, which may be used at any time during content creation. The coupon codes, which may be any type of code associated with a discount, offer, bonus, or the like, may be created as one-time use codes or as multiple use codes. One-time use codes, as the name suggests, may only be used once and are then invalidated and/or removed from the system. Multiple use codes may be used multiple times by a single user, or shared with many users. In some embodiments, multiple use codes may be assigned a limit of how many times the code may be used.

In one embodiment, the administration module 335 may also include a layout module 355. The layout module 355 positions the media player capable of media playback, the content toolkit, and the timeline component of the timing module 350 proximate each other within a single window. This type of layout provides a streamlined interface such that a content creator does not have to switch contexts between windows and/or other interfaces in order to load, edit, and synchronize the one or more interactive content elements with the multimedia element.

The distribution module 360 distributes the one or more interactive content elements synchronized with the multimedia element to advertising affiliates and/or other third party platforms. For example, in one embodiment, a content creator loads a video, creates interactive content, and synchronizes the content with the video. The distribution module 360 distributes the content to advertising affiliates who may embed the video, together with the synchronized interactive content, on their website. In this manner, the content creator is able to gain more real-time feedback in response to a user interacting with the one or more interactive content elements than traditional advertising methods, such as banner-ads and email campaigns.

Further, in some embodiments, when the video is interacted with by a user, the affiliate may gain an affiliate commission and/or credit. In one embodiment, the embedded code used to display the multimedia content may include the affiliate's identifier and/or an affiliate code in order to trace any interactivity with the multimedia content to the affiliate. The affiliate, in certain embodiments, may receive credits, commissions, or the like, in response to users playing the multimedia content on the affiliate's site, making a purchase associated with the multimedia content, interacting with the interactive content elements, and/or the like.

In some embodiments, the multimedia element and its synchronized interactive content elements may be stored on a server. The distribution module 360, in one embodiment, may share with affiliates an embed link for the multimedia element and its synchronized interactive content elements. In this manner, all the affiliates are linking to the same content stored on the server, which may allow changes and/or updates to the multimedia element and/or the one or more interactive content elements to be distributed in real-time among affiliates that may use the embedded content.

For example, in one embodiment, a product video may be loaded by a retailer. The retailer may place an interactive "Buy Now" button at the end of the video that a viewer may use to buy the product displayed in the video. The retailer stores the video on a server and shares an embed link with his advertising affiliates, who in turn display the video on their one or more websites. The retailer, however, would also like to add a "More Info" button that a viewer can use to get more information about the product. The retailer only has to add the button to the video stored on the server and all the videos displayed on affiliate websites using the embed link will be updated simultaneously in real-time.

The distribution module 360, in some embodiments, integrates the apparatus 300 with social media sites such as Facebook®, Twitter®, Google+®, and the like, providing the content creator with an effective tool to quickly share and promulgate content. In one embodiment, the distribution module 360 may post multimedia content, with its one or more synchronized interactive content elements, on a user's social media site. The one or more interactive content elements may include trivia questions, survey questions, polls, quizzes, games, and the like that may be used to gain real-time information from others in the user's social network who view the content on the user's social media site. In other embodiments, the distribution module 360 shares a user's customized recommendations, scores, evaluations, and the like in real-time on their social media site. The social media site allows the content to be shared by others in the user's social network, including the user's friends, friends of the user's friends, and so on, quickly promulgating the content.

For example, a user may share an e-learning video, which includes synchronized interactive content, on the "wall" of his Facebook page. The user's "friends" may watch the video on the user's "wall," while simultaneously providing feedback and data in real-time by interacting with the interactive content. The user's "friends" may share the video with their friends by "liking" the video posted on the user's wall. The friends of the user's friends may also "like" the video, thus virally distributing the video through the user's social network. This viral promulgation may allow a content creator to produce brand awareness, product sales, and/or other marketing objectives through a self-replicating viral process. In other embodiments, the content may be distributed virally through interactive games, eBooks, images, text messages, and the like.

In one embodiment, the distribution module 360 distributes the multimedia content through "embedded experiences." "Embedded experiences," as used herein, are means to embed the services provided by a third party into a container on a social network website. For example, a user may share a YouTube video on their Twitter feed. YouTube may post a tweet about the video to the user's Twitter account. The tweet may contain an "embedded experience" where the user's Twitter followers may view the video from within Twitter without having to go to the YouTube website to watch the video. Further, an "embedded experience" may allow a user to perform other actions, such as sharing content, reviewing content, posting comments, or the like. The service providing the "embedded experience" may specify which features to make available to a user.

Figure 12:
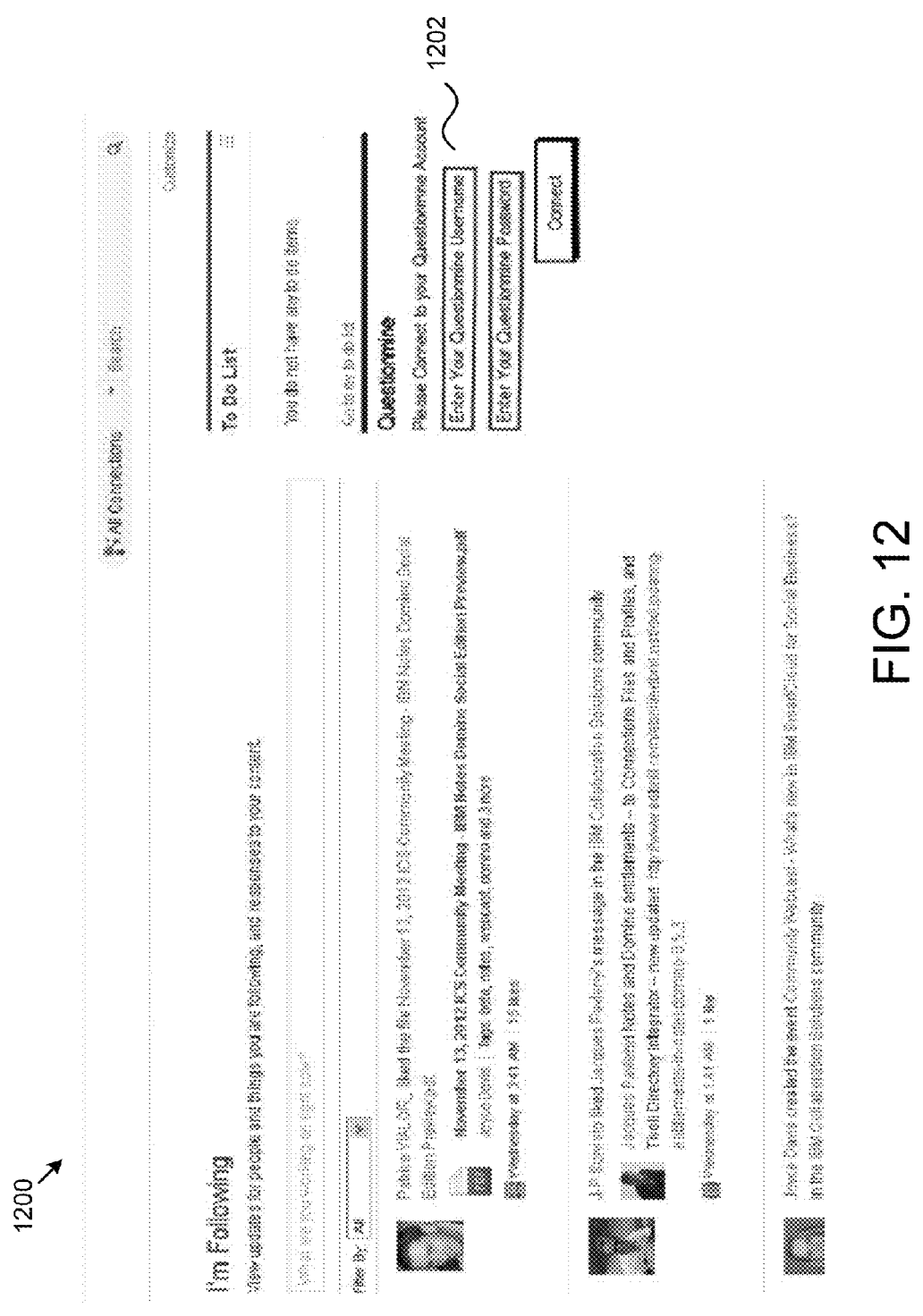

In some embodiments, the distribution module 360 provides an "embedded experience," as illustrated in FIG. 12, where a user logs 1202 into their administration account from a social network website, such as Facebook, Twitter, or the like. In another embodiment, the "embedded experience" may be contained within an IBM® Connections webpage. IBM® Connections is a social software platform for organizations and enterprises. In one embodiment, the "embedded experience" may be embodied as an open social gadget and/or an iWidget. As used herein, the open social framework includes multiple application programming interfaces ("API") that allow social software applications, such as an open social gadget or iWidget, to access data and core functionality on participating social networks. An open social gadget or iWidget may be developed in a web-based programming language, such as HTML, JavaScript, or the like.

Figure 13:
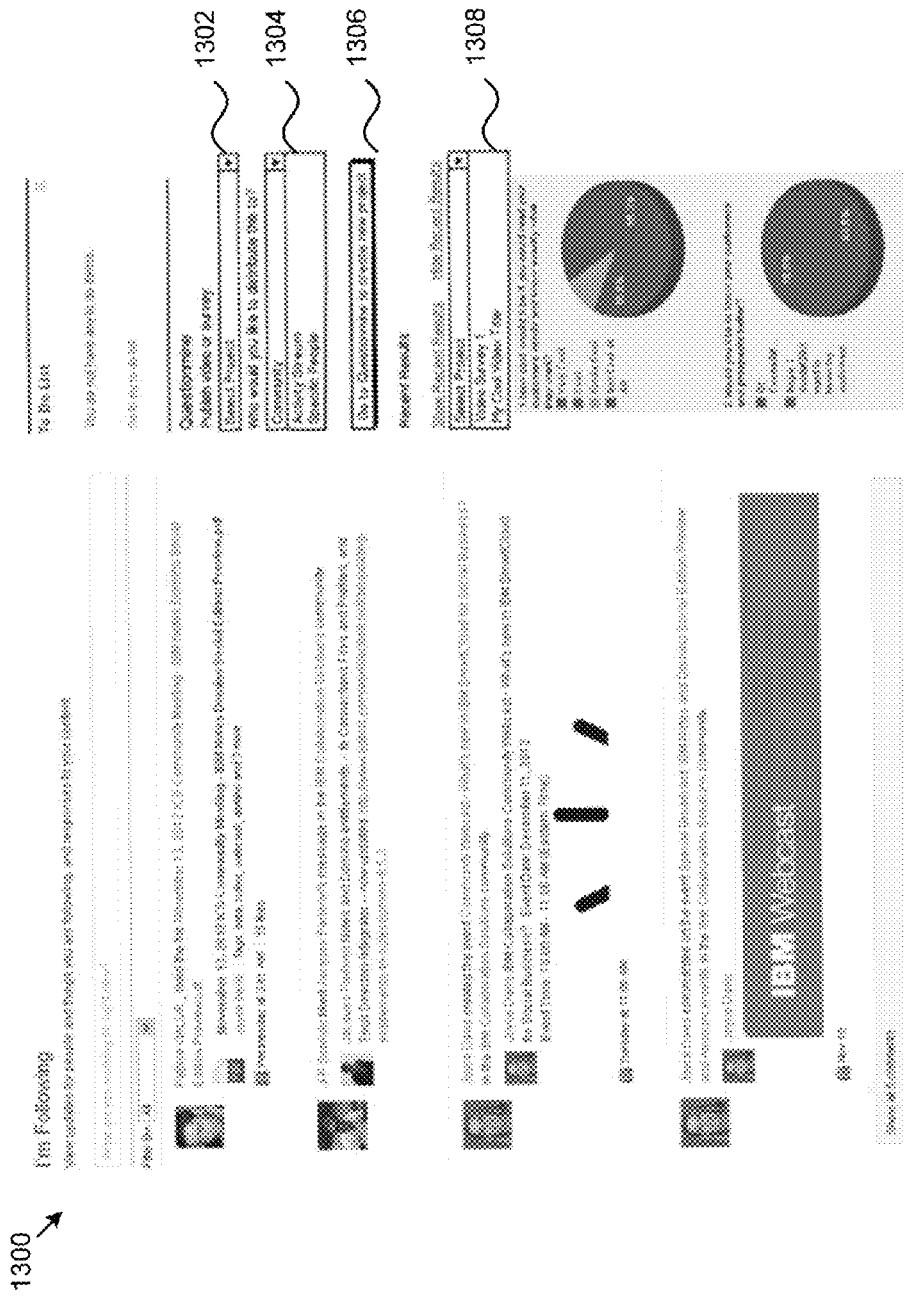
FIG. 13 is an illustration of another embodiment of an interface with an embedded experience in accordance with the subject matter disclosed herein.

In one embodiment, as illustrated in FIG. 13, the user accessing his account through the "embedded experience," after logging in to his account, may select 1302 a project to distribute to others on the social network where the "embedded experience" is being contained. The user, in a further embodiment, may select 1304 friends and/or contacts to share the project with. In some embodiments, the user may distribute the content to one or more specific persons, post the content in a general status update message, distribute the content to a specific group within an organization, and/or the like. For example, the user may distribute the content to the marketing department from their IBM® Connections account. In another embodiment, the user may access 1308 a snapshot of key metrics associated with the multimedia content shared through the "embedded experience" by selecting the appropriate project from a drop-down, or similar, menu within the "embedded experience" container. In other embodiments, the "embedded experience" container displays a link 1306 to the user's administrator account that, when clicked, takes the user to their administration account where the user may create more interactive multimedia content, view the full set of metrics, or the like.

Figure 14:
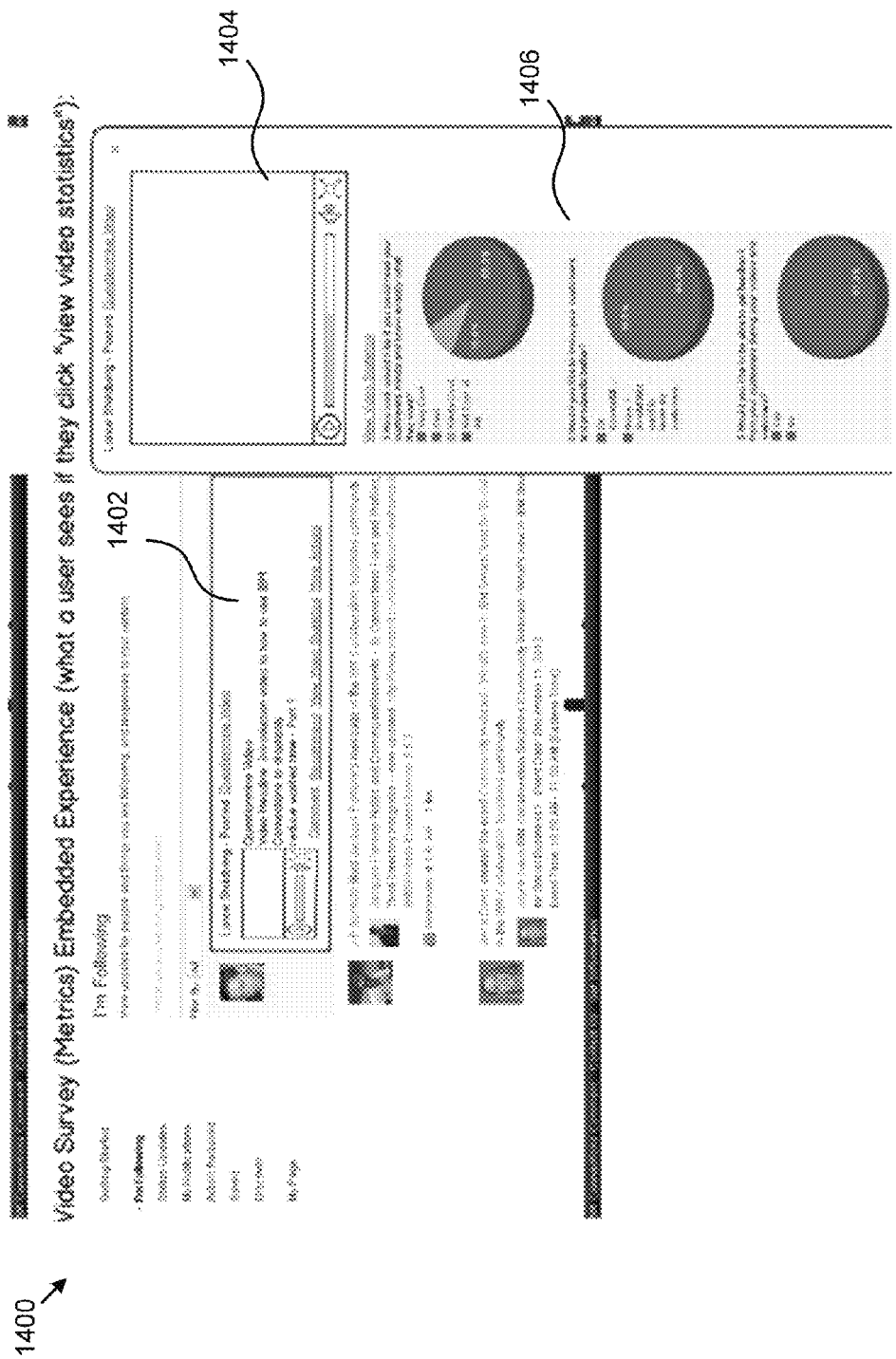
FIG. 14 is an illustration of yet another embodiment of an interface with an embedded experience in accordance with the subject matter disclosed herein.

In another embodiment, the "embedded experience" may be a container for distributed interactive multimedia content. For example, as illustrated in FIG. 14, a video that is shared by a user on their IBM® Connections webpage 1402 may be displayed 1404 in an open social gadget and/or iWidget on the recipient's IBM® Connections webpage. In one embodiment, the "embedded experience" may be shared on a user's social activity stream, a user's social webpage, or the like. In another embodiment, the "embedded experience" may be sent to a user in an email and may be viewed within the body of the email. In yet another embodiment, the email may contain a link to the "embedded experience" that a user can click to take them to their social webpage to view the shared content. For example, a user may receive an email from IBM® Connections that says, "John Doe shared a video with you. Click here to view the video." The video may be viewed either within the email itself or the recipient may click a link that takes them to their IBM® Connections webpage to view the video. The video may contain interactive content in accordance with this disclosure, such as surveys, quizzes, lead capture forms, or the like. In some embodiments, the recipient may be allowed to view 1406 responses and/or statistics of all previous viewers of the content within the "embedded experience" container. In one embodiment, the responses of previous viewers are not viewable by the recipient unless the user sharing the content specifies that the recipient may view the responses of previous viewers.

Referring to FIG. 3, in another embodiment, the distribution module 360 may send the multimedia element synchronized with one or more interactive content elements directly to a mobile device, such as a smart phone, in response to a scanned "quick response" ("QR") code. The QR code may be printed on any direct mail piece, such as brochures, print advertisements, newspapers, and the like, or may be found posted in stores or other places. For example, a user may use a smart phone to scan a QR code associated with a product advertisement printed in a newspaper. The distribution module 360 may display a video and/or interactive content, such as survey questions, in response to the QR code being scanned. Alternatively, the distribution module 360 may display product offers, promotions, and/or other rewards created by the rewards module 330 in response to a scanned QR code. In other embodiments, the distribution module 360 may send interactive content, such as customer service surveys, to a device in response to a scanned sales receipt, a printed code manually entered by a user, a printed URL on a receipt, a URL in an SMS message, and/or the like.

In one embodiment, the distribution module 360 may be located on a device and may send the multimedia and interactive content elements to another device in response to a "near field" communication ("NFC") request. For example, the distribution module 360 may be located on an iPhone which has synchronized multimedia and interactive content elements stored on the phone. An iPad may use an NFC request to request the multimedia and interactive content elements from the iPhone, which the distribution module 360 may then send to the iPad. In another example, a smart TV may send out NFC notifications to any proximate client devices 106 capable of receiving NFC communications. The distribution module 360 may then distribute content to any client devices 106 that respond to the NFC notification.

In another embodiment, the distribution module 360 distributes multimedia and interactive content elements to a crowd sourcing service, such as kickstarter.com, 99designs.com, and the like. For example, a user may create a video highlighting their products, goods, services, or the like to be evaluated by others. The video may show a series of products where after one product is shown, and before the product is displayed, an interactive survey appears requesting a viewer's opinions, reviews, comments, or the like, regarding the displayed product. The viewer, in order to view the remaining products in the video, would need to answer one or more survey questions to continue playback. In one embodiment, the content creator may offer a discount, prize, gift, or the like to incentivize the viewer to donate money to the content creator's project and/or obtain the viewer's feedback. In other embodiments, the content creator may request suggestions from a viewer and rank the results according to the most helpful suggestions. The content creator may offer prizes for first, second and third place, or the like.

In one embodiment, the distribution module 360 distributes multimedia and interactive content elements to photo sharing websites. In certain embodiments, the photo sharing websites contain static images, videos, and other dynamic content, such as animated gifs. In another embodiment, the photo sharing website includes a pinboard-style layout, such as pinterest.com, lockerz.com, or the like. The distribution module 360 may distribute interactive content elements to display with the multimedia content. For example, the photos may include hotspots, survey questions, or the like, associated with the displayed photos. The interactive content, in one embodiment, is not visible until the user rolls over the photos, for example, with a mouse or other input device.

In another embodiment, the distribution module 360 delivers multimedia with interactive content to gaming applications played on mobile devices, smart phones, consoles, interactive televisions, computers, or the like. Often, game developers provide "in-app" or "in-game" elements, such as "in-app" purchases or advertising, to try to incentivize a player to spend money, visit an advertiser's website, or the like. For example, a player may be required to spend money to "level up" or purchase the next stage of a game to continue playing. In one embodiment, the distribution module 360 distributes interactive multimedia content as the "in-app" element. For example, in order for a player to get to the next level or "level up," he may be required to view a video and answer survey questions, take a quiz, fill out a lead form, or the like, associated with the video. In other embodiments, actions or events within the game would trigger the presentation of the "in-app" element. For example, an interactive video survey may be displayed when a player reaches a certain level, attains an achievement, or goes to a specific place within the game. Further, in addition to interactive videos, in other embodiments the distribution module 360 delivers interactive advertisements, sweepstakes, quizzes, and/or the like. In certain embodiments, the player's responses are collected and analyzed by the analysis module 310.

In other embodiments, a software application, such as a game, may include an augmented reality environment, such that the application includes a view of a real-world environment with elements that are augmented by computer-generated sensory input, such as audio, video, graphics, GPS, or the like. For example, a user walking down a street may be viewing the extent of the street in front of them through an application running on a mobile device. The application may augment the street view on the mobile device by adding computer generated elements, such as ratings for various restaurants on the street, offers and various retail stores on the street, points of interest, or the like. The distribution module 360, in one embodiment, distributes interactive media content to the application running on the smart device to augment the view of the street. Thus, for example, in order to receive a discount at a store on the street, the user would need to watch a product video and complete a questionnaire associated with the video. The coupon would then be sent via text, email, or the like, to the user in response to completing the questionnaire.

The administration module 335, in one embodiment, may also include a forms module 365 that may be used to create interactive forms incorporating various types of the above mentioned multimedia elements. For example, a content creator may want to display an opt-in form on their company web site with an embedded video describing the company. The user may gain additional information about the company by disclosing on the opt-in form information such as the user's name, email address, and the like. In response to the user disclosing information on the opt-in form, the trigger module 225 may display additional multimedia and/or interactive content elements. The trigger module 225, in other embodiments, may respond by displaying a different website, sending an email, and/or the like. In another embodiment, the trigger module 225 sends real-time responses in response to receiving a completed form from a user, via email, text message, and/or the like. In one embodiment, the trigger module 225 may use the rewards module 330 to offer the user incentives, offers, promotions, and the like in return for disclosing information on the opt-in form. Other types of forms may include various legal documents, contracts, agreements, records, and the like.

The payment module 370, in one embodiment, is configured to collect payments, produce invoices, and/or facilitate other financial transaction related activities in connection with a user's interaction with the multimedia element and/or the one or more interactive content elements. For example, a user may click on a product advertisement on a webpage to purchase the advertised product. Instead of being directed to the product seller's website, as in traditional systems, the user is presented with an interactive form created by the forms module 365 that allows the user to fill in their billing information and purchase the product from the current site. Alternatively, the payment module creates an invoice of the purchase for the user.

In other embodiments, the payment module 370 is configured to support micro-transactions, where items such as currency, loyalty points, achievements, and the like, can accumulate throughout the user interaction period, not only at a specific point of purchase. In some embodiments, the payment module 370 may provide a digital "shopping cart," similar to most online retail stores, where a user can select one or more products during their interaction period to purchase in a single transaction when the user is finished. The payment module 370 may be configured to accept real currency, loyalty points, rewards points, and/or the like from the user to complete a transaction.

Figure 5:
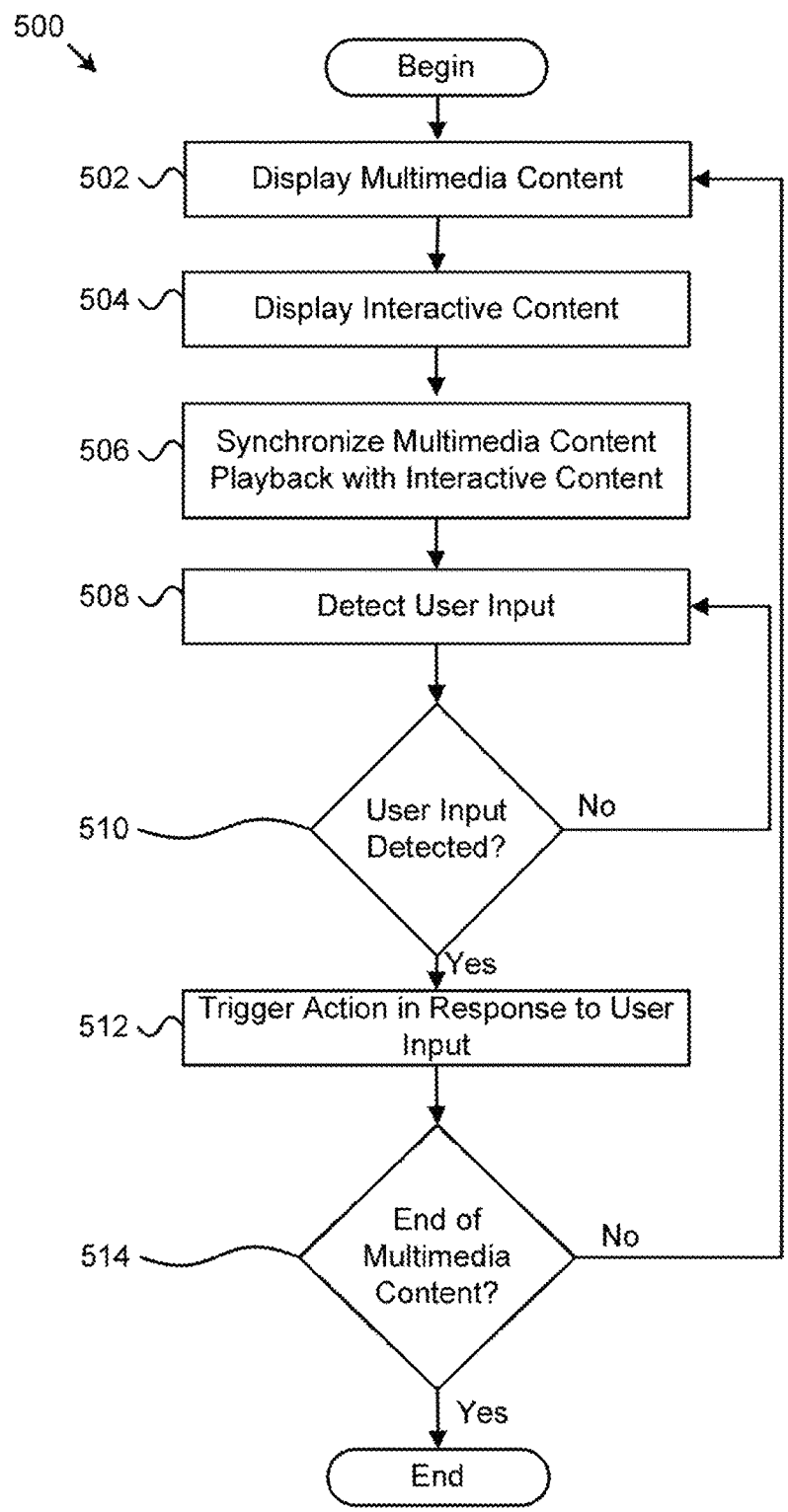
FIG. 5 is a schematic flow chart diagram illustrating one embodiment of a method for synchronizing interactive content with multimedia in accordance with the subject matter disclosed herein.

FIG. 5 is a schematic flow chart diagram illustrating one embodiment of a method 500 for synchronizing interactive content with multimedia. The method 500 begins and the media module 205 presents multimedia content to be displayed 502. The content module 210 presents one or more interactive content elements to be displayed 504 with the multimedia element. The media module 205 may present the visual and/or audible content by visually displaying the content on an electronic display of the client computer 106 and/or playing the audio file associated with the audible and/or visual content. The synchronization module 215 synchronizes 506 the one or more interactive content elements displayed by the content module 210 with the multimedia element displayed by the media module 205. In one embodiment, as the multimedia element is presented, the synchronization module 215 updates the interactive content in response to the segment of the multimedia being presented.

The input detection module 220 detects user interaction 508 with the interactive content and employs a trigger module 225 that performs an action in response to the user input 512. If the input detection module 220 does not detect 510 user input, it will continue to detect user input 510 and employ the trigger module 225 until the multimedia content has ended 514. If the multimedia content has not ended 514, the synchronization module 215 will continue to synchronize the multimedia element with the one or more interactive content elements. The input detection module 220 will continue to detect user input until the multimedia content is finished 514. Then the method 500 ends.

Figure 6:
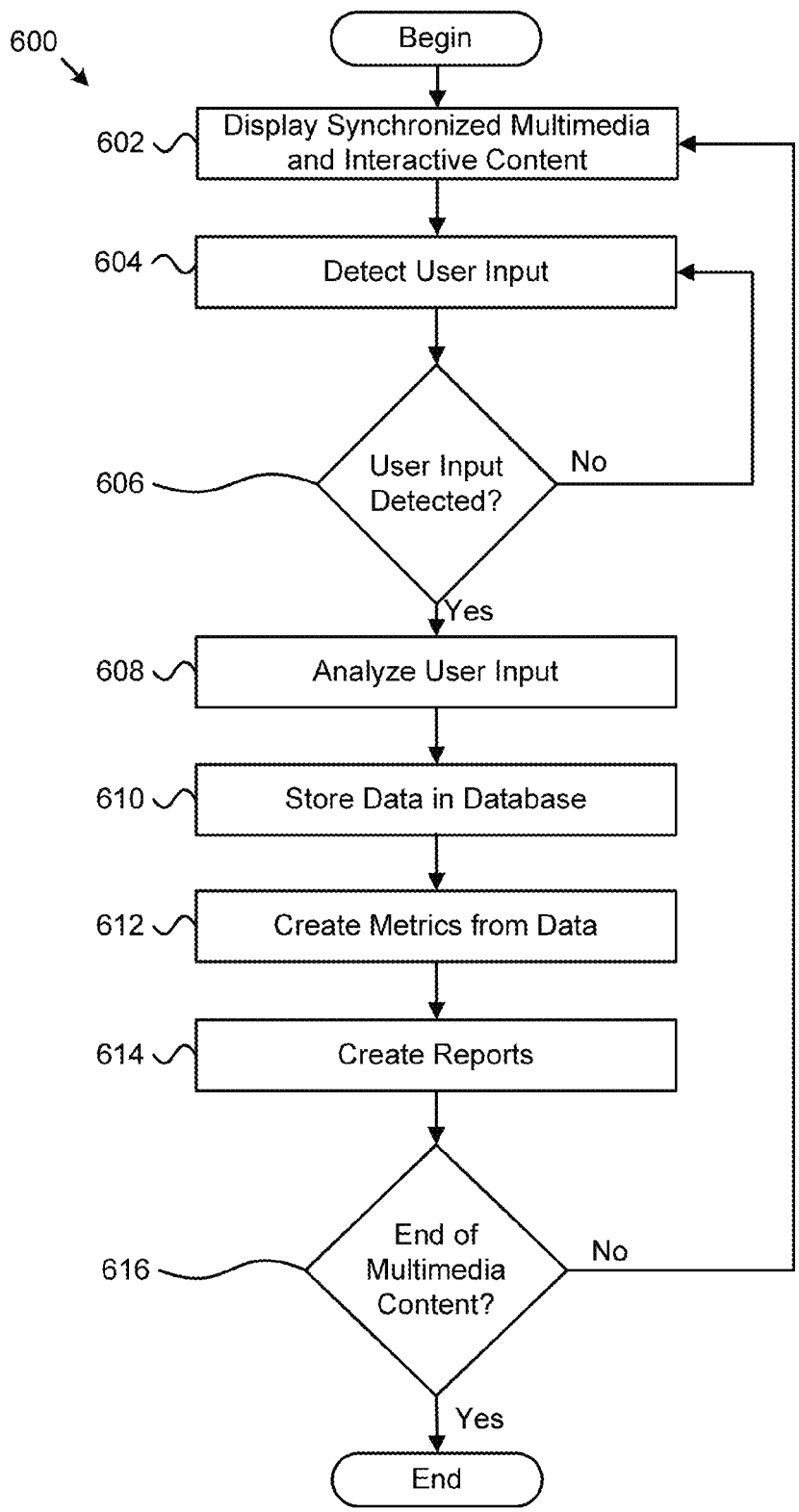
FIG. 6 is a schematic flow chart diagram illustrating another embodiment of a method for synchronizing interactive content with multimedia in accordance with the subject matter disclosed herein.

FIG. 6 is a schematic flow chart diagram illustrating an embodiment of a method 600 for synchronizing interactive content with multimedia. The method 600 begins and the synchronization module 215 synchronizes a multimedia element displayed 602 by the media module 205 with one or more interactive content elements displayed by the content module 210. The media module 205 may present the visual and/or audible content by visually displaying the content on an electronic display of the client computer 106 and/or playing the audio file associated with the audio and/or visual content.

The input detection module, in one embodiment, 220 detects 604 user input in response to a user interacting with an interactive content element. The method 600 will continue to detect 606 user input if it is not present. If user input is detected 606, the analysis module 310 analyzes 608 the input data. The data, in certain embodiments, may be stored in a database 610 for future use by additional modules and/or applications. The metrics module 315 may use the data 612 to create custom metrics regarding the user input detected by the input detection module 220. Further, the data may be used to create custom reports 614, such as recommendations, evaluations, and assessments in response to the user input detected by the input detection module 220.

If playback of the multimedia content has not finished 616, the method 600 will continue to display 602 the one or more interactive content elements synchronized with the multimedia element. Otherwise, the method 600 ends.

Figure 7:
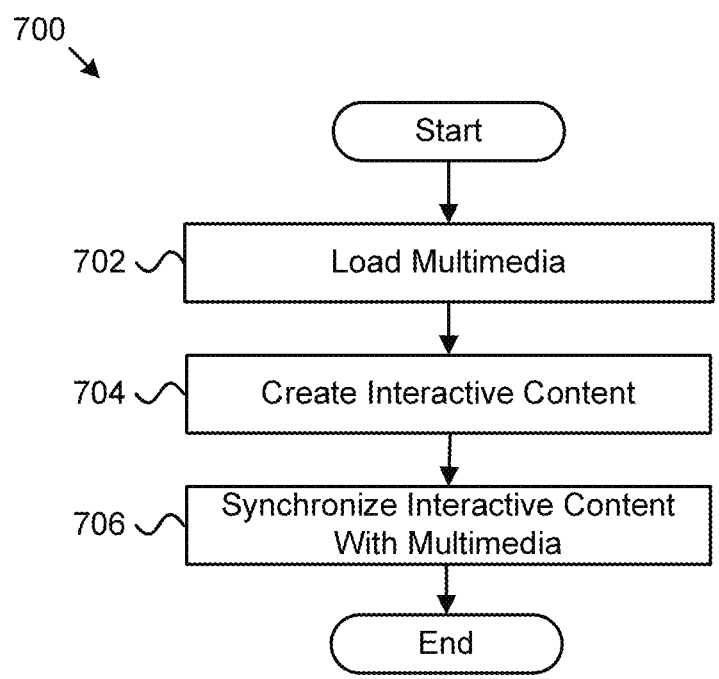
FIG. 7 is a schematic flow chart diagram illustrating an embodiment of a method for creating synchronized interactive content with multimedia in accordance with the subject matter disclosed herein.

FIG. 7 is a schematic flow chart diagram illustrating an embodiment of a method 700 for loading, editing, and synchronizing one or more interactive content elements with a multimedia element. The method 700 begins and the loading module 340 loads a multimedia element 702 into a media player capable of multimedia playback. The editing module 345 provides an interface that the content creator may use to create and/or edit one or more interactive content elements 704. The timing module 350 synchronizes 706 the one or more interactive content elements with the multimedia element loaded by the loading module 340. Then the method 700 ends.

Figure 8:
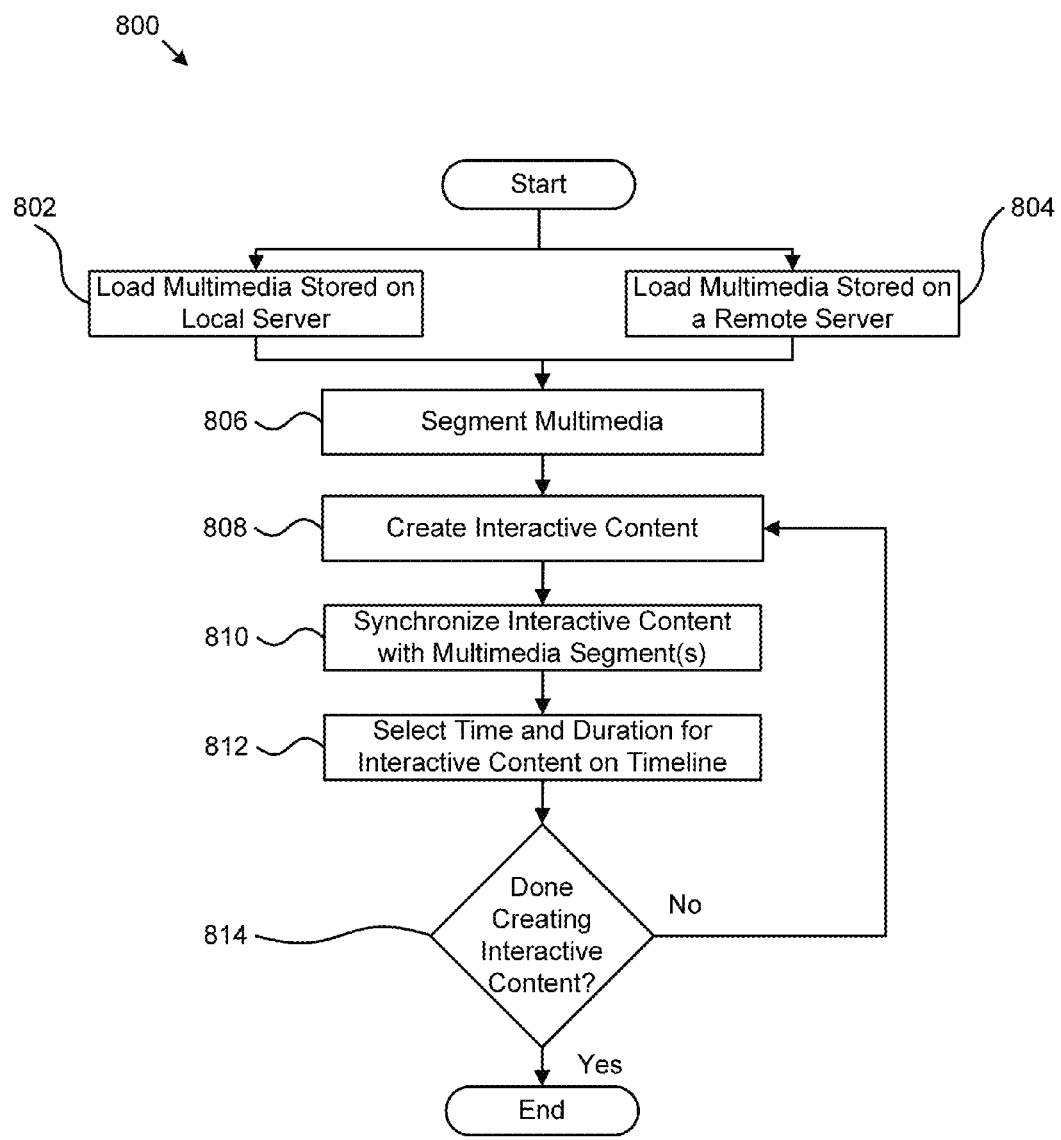
FIG. 8 is a schematic flow chart diagram illustrating another embodiment of a method for creating synchronized interactive content with multimedia in accordance with the subject matter disclosed herein.

FIG. 8 is a schematic flow chart diagram illustrating another embodiment of a method 800 for loading, editing, and synchronizing one or more interactive content elements with a multimedia element. The method 800 begins and the loading module 340 loads a multimedia element that has been uploaded and stored on a local server 802 or loads multimedia stored on a remote server 804. The remote server may be a hosting site such as YouTube®, a cloud storage service such as Amazon® S3, or the like. The loading module 340 segments the multimedia element 806 into one or more segments.

The editing module 345, in one embodiment, provides an interface that a content creator can use to create and/or edit one or more interactive content elements 808. The timing module 350 synchronizes 810 the one or more interactive content elements with the multimedia element loaded by the loading module 340. In one embodiment, a timeline component may be used to select a time and duration 812 in the multimedia element for each of the one or more interactive content elements to be displayed. The one or more interactive content elements are then associated with the one or more multimedia segments, represented by the selected time and duration. The content creator may continue 814 to create one or more interactive content elements 808 if he is not finished assigning interactive content elements to the one or more multimedia segments. Otherwise, the method 800 ends.

Figure 11:
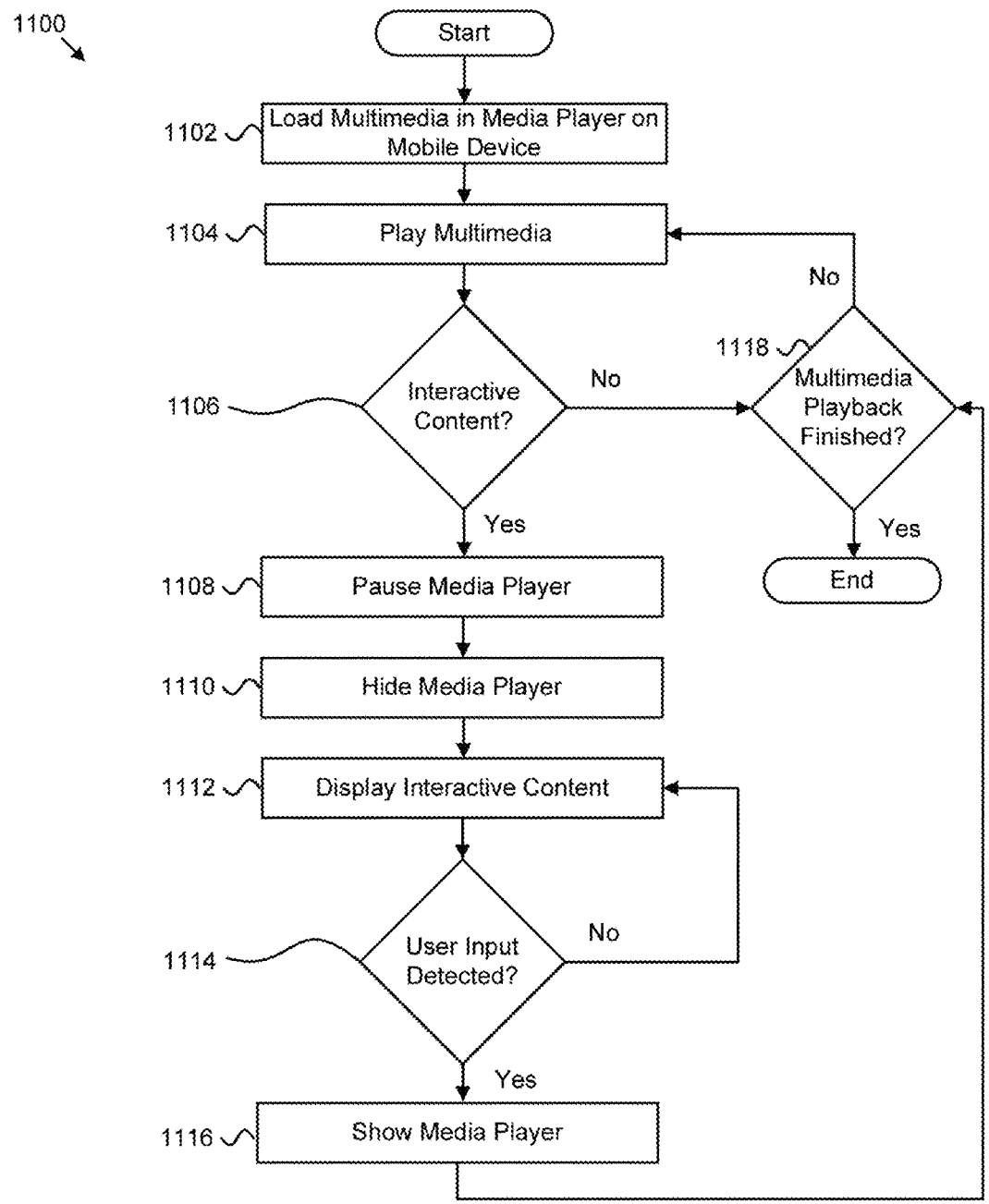
FIG. 11 is a schematic flow chart diagram illustrating an embodiment of a method for displaying synchronized interactive content with multimedia on a mobile device in accordance with the subject matter disclosed herein.

FIG. 11 is a schematic flow chart diagram illustrating one embodiment of a method 1100 for displaying multimedia and interactive content on a mobile device. The method 1100 begins and the media module 205 loads a multimedia element into a media player on a mobile device 1102 and begins playback 1104 of the multimedia element. The synchronization module 215 continues to check for interactive content from the content module 210. If there is no interactive content to display, and the multimedia element is not finished playing 1118, the media module 205 continues to play the multimedia element. If there is interactive content, the synchronization module 215 pauses 1108 and hides 1110 the media player while the content module 210 displays the interactive content 1112. The content module 210 continues to display the interactive content until user input is detected 1114. If user input is detected 1114, the content module 215 hides the interactive content and the media module 205 shows the media player to continue playback of the multimedia element 1116. If the multimedia element is not finished playing 1118, the multimedia element will continue playing 1104 and the synchronization module 215 will continue to check for interactive content 1106. Otherwise, the method 1100 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
display a multimedia element playable in a media player capable of multimedia playback, the multimedia element comprising a plurality of distinct segments playable in the media player that highlight one or more of a product and a service provided by a third party, the third party selecting each distinct segment;

display a plurality of interactive content elements associated with each segment of the multimedia element, the plurality of interactive content elements for each segment generated by the third party and intended to prompt a user for a response related to one or more of the product and the service highlighted in a segment of the multimedia element, wherein each of the plurality of interactive content elements is linked to a segment of the multimedia element such that a selection of an interactive content element begins playback of a segment of the multimedia element linked to the selected interactive content element;

synchronize the presentation of the plurality of interactive content elements with playback of a segment of the multimedia element such that the one or more interactive content elements are presented at predefined times during playback of a segment of the multimedia element, wherein playback of the multimedia element is paused at the end of playback of a segment of the multimedia element and a plurality of interactive content elements associated with the played segment of the multimedia element are presented; and detect user input in response to a user selecting one of the plurality of interactive content elements, wherein playback of the multimedia element is resumed in the media player in response to the user selecting an interactive content element.

2. The apparatus of claim 1, wherein the code is further executable by the processor to position the plurality of interactive content elements and the multimedia element on a display such that the plurality of interactive content elements are positioned one or more of proximate and overlaid relative to the media player.

3. The apparatus of claim 1, wherein the code is further executable by the processor to perform an action in response to user input.

4. The apparatus of claim 3, wherein an action is performed in response to receiving input from one or more of an external and internal cue.

5. The apparatus of claim 1, wherein the code is further executable by the processor to play the multimedia element and the plurality of synchronized interactive content elements at a future date and time.

6. The apparatus of claim 1, wherein the code is further executable by the processor to analyze and store data collected from the input.

7. The apparatus of claim 6, wherein the code is further executable by the processor to create customized feedback reports, the feedback reports comprising one or more of recommendations, evaluations, assessments, and explanations.

8. The apparatus of claim 6, wherein the code is further executable by the processor to organize the collected data and create one or more metrics based on the collected data.

9. The apparatus of claim 6, wherein the code is further executable by the processor to integrate the collected data with external applications, the external applications comprising one or more of e-commerce systems, customer relationship management systems, email systems, and social media platforms.

10. The apparatus of claim 1, wherein the code is further executable by the processor to provide a reward in response to actions, the reward comprising one or more of loyalty points, incentives, discounts, coupons, badges, achievements, bargains, promotions, and offers.

11. The apparatus of claim 1, wherein the plurality of interactive content elements comprises one or more of survey questions, polls, quizzes, hyperlinked text, hotspots, and buttons that are synchronized to the multimedia element.

12. The apparatus of claim 1, wherein the code is further executable by the processor to:
load and divide a multimedia element into one or more segments;
create a plurality of interactive content elements associated with the multimedia element; and
synchronize the presentation of the plurality of interactive content elements with the one or more segments of the multimedia element, the position and duration of the plurality of interactive content elements in the multimedia element being set on a timeline.

13. The apparatus of claim 12, wherein the code is further executable by the processor to distribute the plurality of interactive content elements synchronized with the multimedia element.

14. A method comprising:
displaying a multimedia element playable in a media player capable of multimedia playback on a display, the multimedia element comprising a plurality of distinct segments playable in the media player that highlight one or more of a product and a service provided by a third party, the third party selecting each distinct segment;
displaying a plurality of interactive content elements associated with each segment of the multimedia element on a display, the plurality of interactive content elements for each segment generated by the third party and intended to prompt a user for a response related to one or more of the product and the service highlighted in a segment of the multimedia element, wherein each of the plurality of interactive content elements is linked to a segment of the multimedia element such that a selection of an interactive content element begins playback of a segment of the multimedia element linked to the selected interactive content element;
synchronizing presentation of the plurality of interactive content elements with playback of a segment of the multimedia element such that the plurality of interactive content elements are presented at predefined times during playback of a segment of the multimedia element, wherein playback of the multimedia element is paused at the end of playback of a segment of the multimedia element and a plurality of interactive content elements associated with the played segment of the multimedia element are presented; and
detecting user input in response to a user selecting one of the plurality of interactive content elements, wherein playback of the multimedia element is resumed in the media player in response to the user selecting an interactive content element.

15. The method of claim 14, wherein detecting user input in response to the user interacting with an interactive content element of the plurality of interactive content elements further comprises triggering an action.

16. The method of claim 14, further comprising collecting metrics in real-time in response to a user interacting with the an interactive content element of the plurality of interactive content elements.

17. The method of claim 14, wherein the plurality of displayed interactive content elements comprises one or more of surveys, quizzes, polls, hyperlinked text, hotspots, and buttons.

18. The method of claim 14, further comprising:
loading a multimedia element in a media player capable of multimedia playback;
dividing the multimedia element into one or more media segments;
creating a plurality of interactive content elements associated with each segment of the multimedia element; and
synchronizing the presentation of the plurality of interactive content elements with the one or more media segments using a timeline interface.

19. A computer program product comprising a non-transitory computer readable storage medium having computer readable program code embodied therewith, the computer readable program code configured to:
display a multimedia element playable in a media player capable of multimedia playback on a display, the multimedia element comprising a plurality of distinct segments playable in the media player that highlight one or more of a product and a service provided by a third party, the third party selecting each distinct segment;
display a plurality of interactive content elements associated with each segment of the multimedia element, the plurality of interactive content elements for each segment generated by the third party and intended to prompt a user for a response related to one or more of the product and the service highlighted in a segment of the multimedia element, wherein each of the plurality of interactive content elements is linked to a segment of the multimedia element such that a selection of an interactive content element begins playback of a segment of the multimedia element linked to the selected interactive content element;
synchronize presentation of the plurality of interactive content elements with playback of a segment of the multimedia element such that the plurality of interactive content elements are presented at predefined times during playback of a segment of the multimedia element, wherein playback of the multimedia element is paused at the end of playback of a segment of the multimedia element and a plurality of interactive content elements associated with the played segment of the multimedia element are presented; and
receive user input in response to a user selecting one of the plurality of interactive content elements, wherein playback of the multimedia element is resumed in the media player in response to the user selecting an interactive content element.

* * * * *